US010868605B2

(12) United States Patent
Wang et al.

(10) Patent No.: US 10,868,605 B2
(45) Date of Patent: Dec. 15, 2020

(54) METHOD AND APPARATUS FOR CHANNEL STATE INFORMATION ESTIMATION

(71) Applicant: Samsung Electronics Co., Ltd., Suwon-si, Gyeonggi-do (KR)

(72) Inventors: Rui Wang, San Jose, CA (US); Junmo Sung, Richardson, TX (US); Jianzhong Zhang, Plano, TX (US); Young-Han Nam, Plano, TX (US); Shouvik Ganguly, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/583,142

(22) Filed: Sep. 25, 2019

(65) Prior Publication Data

US 2020/0099434 A1 Mar. 26, 2020

Related U.S. Application Data

(60) Provisional application No. 62/736,644, filed on Sep. 26, 2018, provisional application No. 62/807,589, filed on Feb. 19, 2019, provisional application No. 62/822,499, filed on Mar. 22, 2019, provisional application No. 62/836,306, filed on Apr. 19, 2019, provisional application No. 62/875,725, filed on Jul. 18, 2019.

(51) Int. Cl.
*H04B 7/06* (2006.01)
*H04B 7/0452* (2017.01)
*H04W 88/08* (2009.01)

(52) U.S. Cl.
CPC ......... *H04B 7/0626* (2013.01); *H04B 7/0452* (2013.01); *H04W 88/08* (2013.01)

(58) Field of Classification Search
CPC .... H04B 7/0626; H04B 7/0452; H04W 88/08
See application file for complete search history.

(56) References Cited

U.S. PATENT DOCUMENTS

| 7,376,210 B2 | 5/2008 | Kim et al. |
| 9,312,929 B2 | 4/2016 | Forenza et al. |
| 9,763,252 B2 | 9/2017 | Kilpatrick, II et al. |

(Continued)

FOREIGN PATENT DOCUMENTS

WO    2018/031367 A1    2/2018

OTHER PUBLICATIONS

NTT Docomo, Inc., "Views on CSI measurement for NR", 3GPP TSG RAN WG1 Meeting 91, Nov. 27-Dec. 1, 2017, R1-1720801, 12 pages.

(Continued)

*Primary Examiner* — Janice N Tieu

(57) ABSTRACT

A method of a base station (BS) for channel state information (CSI) estimation in a wireless communication system is provided. The method of BS comprises: receiving, from a user equipment (UE), a sounding reference signal (SRS) for the CSI estimation; determining whether the received SRS is measurable for the CSI estimation; initializing a set of uplink parameters based on a result of the determination; updating the set of uplink parameters based on SRS history stored in a buffer; and performing, using a channel prediction model and channel reciprocity, the downlink CSI estimation based on the updated parameters.

20 Claims, 27 Drawing Sheets

(56) References Cited

U.S. PATENT DOCUMENTS

| | | | |
|---|---|---|---|
| 2013/0265960 A1* | 10/2013 | Wang | H04L 1/20 |
| | | | 370/329 |
| 2014/0254534 A1 | 9/2014 | Zhang | |
| 2016/0261433 A1 | 9/2016 | Mishra et al. | |
| 2016/0380712 A1 | 12/2016 | Levy | |
| 2017/0034870 A1* | 2/2017 | Uchino | H04W 72/0406 |
| 2018/0160423 A1* | 6/2018 | Yan | H04W 72/04 |

OTHER PUBLICATIONS

International Search Report dated Jan. 7, 2020 in connection with International Patent Application No. PCT/KR2019/012536, 4 pages.
Written Opinion of the International Searching Authority dated Jan. 7, 2020 in connection with International Patent Application No. PCT/KR2019/012536, 5 pages.

* cited by examiner

METHOD AND APPARATUS FOR CHANNEL STATE INFORMATION ESTIMATION

CROSS-REFERENCE TO RELATED APPLICATIONS AND CLAIM OF PRIORITY

The present application claims priority to:
U.S. Provisional Patent Application Ser. No. 62/736,644 filed on Sep. 26, 2018;
U.S. Provisional Patent Application Ser. No. 62/807,589 filed on Feb. 19, 2019;
U.S. Provisional Patent Application Ser. No. 62/822,499 filed on Mar. 22, 2019;
U.S. Provisional Patent Application Ser. No. 62/836,306 filed on Apr. 19, 2019; and
U.S. Provisional Patent Application Ser. No. 62/875,725 filed on Jul. 18, 2019.
The content of the above-identified patent documents is incorporated herein by reference.

TECHNICAL FIELD

The present disclosure relates generally to CSI acquisition. In particular, the present disclosure relates to channel state information estimation and prediction in wireless communication systems.

BACKGROUND

Massive MIMO (mMIMO) is an important technology to improve the spectral efficiency of 4G and 5G cellular networks. The number of antennas in mMIMO is typically much larger than the number of user equipment (UE), which allows BS to perform multi-user downlink (DL) beamforming to schedule parallel data transmission on the same time-frequency resources. However, its performance depends heavily on the quality of channel state information (CSI) at BS. It has been recently verified that the MU-MIMO performance degrades with UE mobility.

SUMMARY

Embodiments of the present disclosure provide methods and apparatuses for CSI estimation and prediction for next generation cellular systems in an advanced wireless communication system.

In one embodiment, a base station (BS) for channel state information (CSI) estimation in a wireless communication system is provided. The BS comprises a transceiver configured to receive, from a user equipment (UE), a sounding reference signal (SRS) for the CSI estimation. The BS further comprises a processor operably connected to the transceiver, the processor configured to determine whether the received SRS is measurable for the CSI estimation, initialize a set of uplink parameters based on a result of the determination, update the set of uplink parameters based on SRS history stored in a buffer, and perform, using a channel prediction model and channel reciprocity, the downlink CSI estimation the updated set of uplink parameters.

In another embodiment, a method of a base station (BS) for channel state information (CSI) estimation in a wireless communication system is provide. The method of BS comprises receiving, from a user equipment (UE), a sounding reference signal (SRS) for the CSI estimation, determining whether the received SRS is measurable for the CSI estimation, initializing a set of uplink parameters based on a result of the determination, updating the set of uplink parameters based on SRS history stored in a buffer, and performing, using a channel prediction model and channel reciprocity, the downlink CSI estimation based on the updated uplink parameters.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
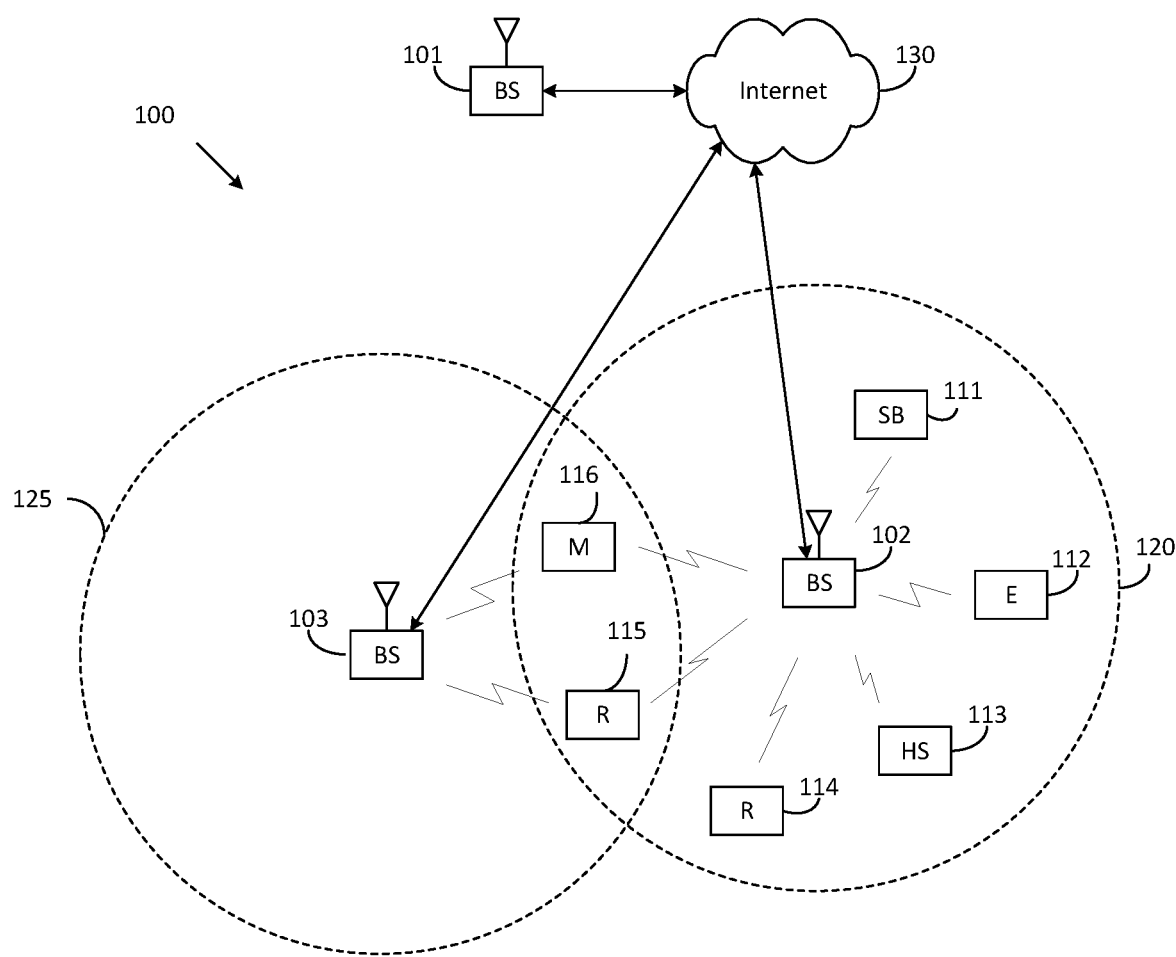
FIG. 1 illustrates an example wireless network according to embodiments of the present disclosure.

FIG. 1 through FIG. 30, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

The present disclosure covers several components which can be used in conjunction or in combination with one another, or can operate as standalone schemes.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 2:
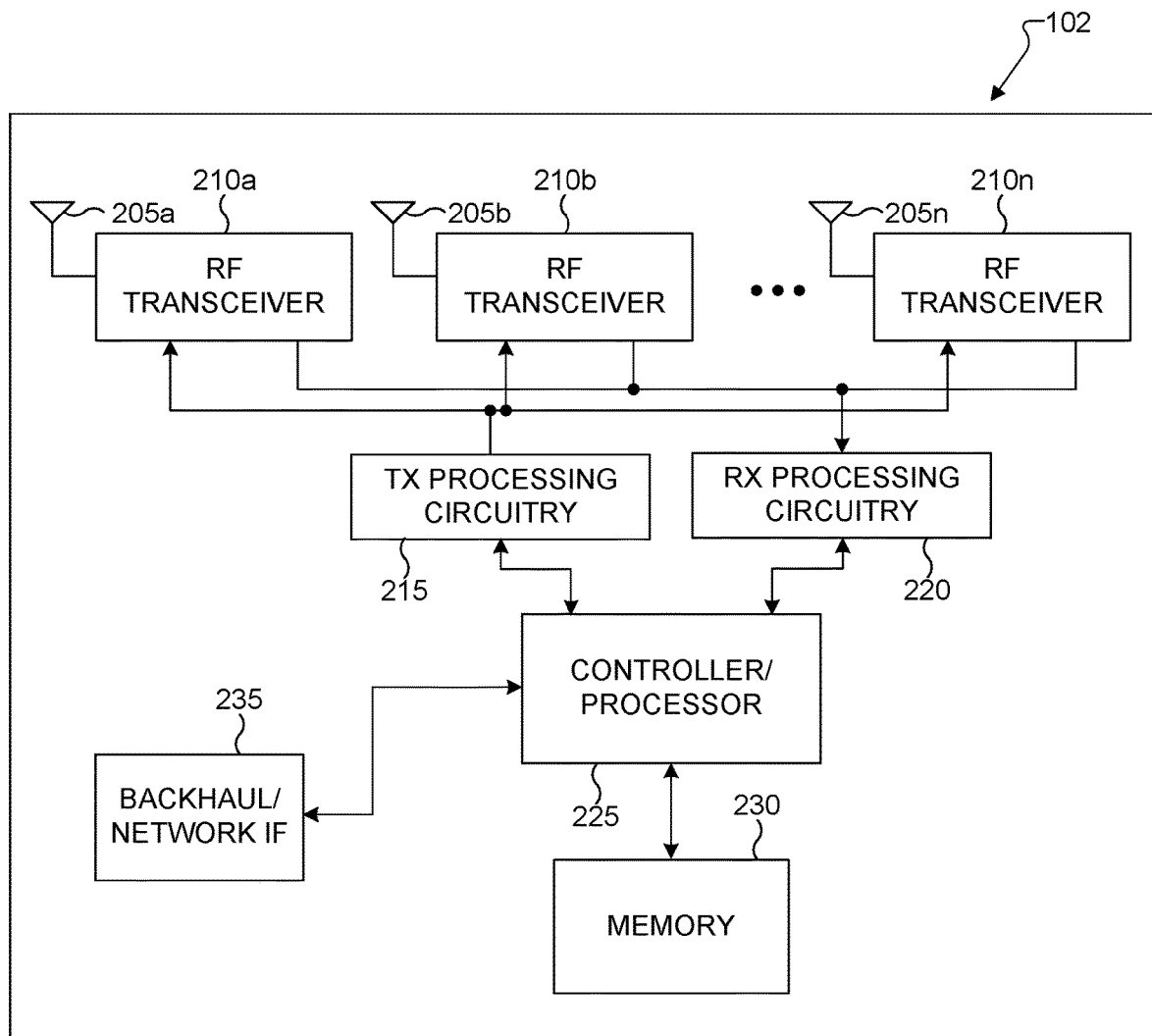
FIG. 2 illustrates an example gNB according to embodiments of the present disclosure.
Figure 3:
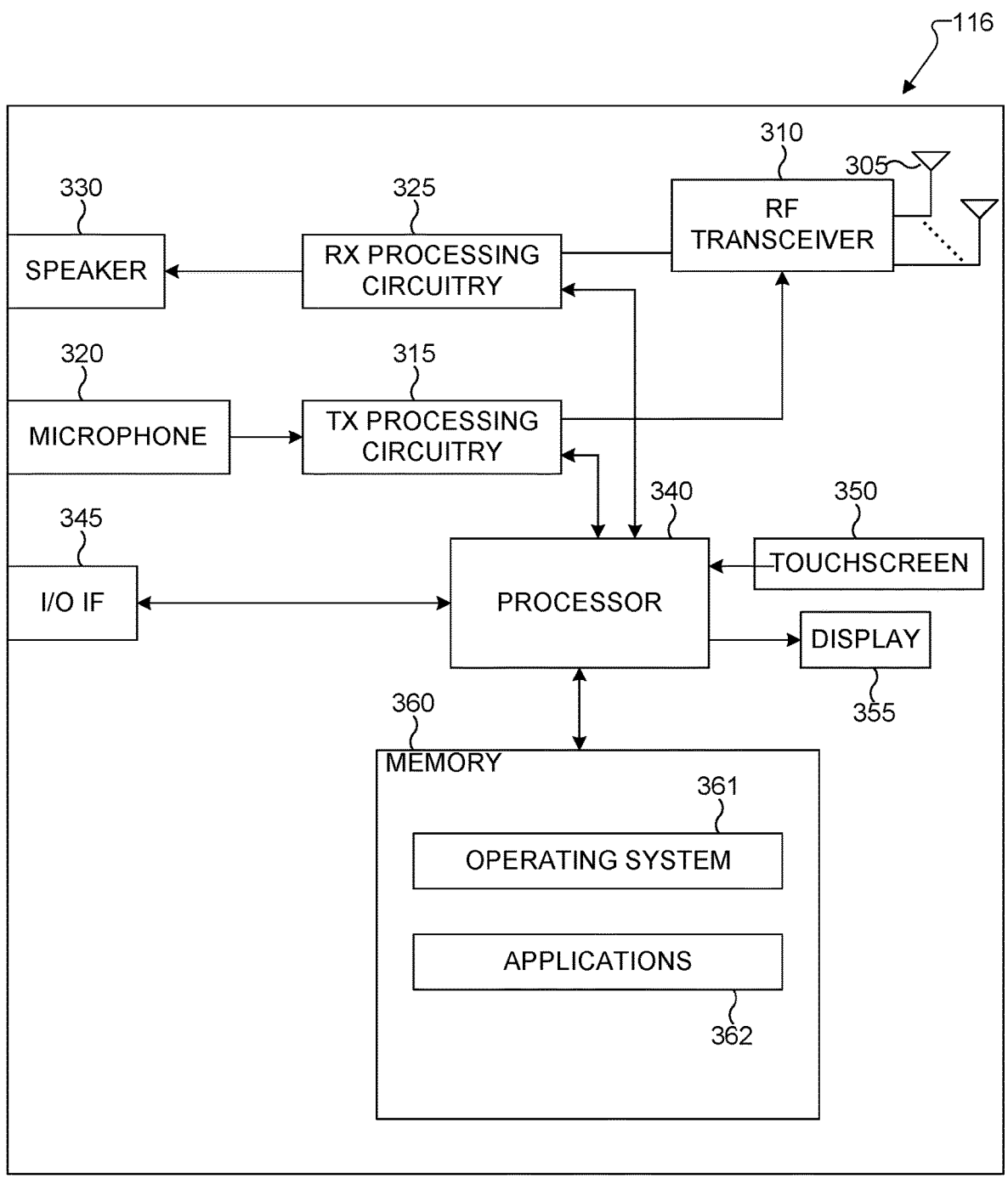
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for efficient CSI estimation in an advanced wireless communication system. In certain embodiments, and one or more of the gNBs 101-103 includes circuitry, programing, or a combination thereof, for CSI acquisition based on space-frequency compression in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on uplink channel. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
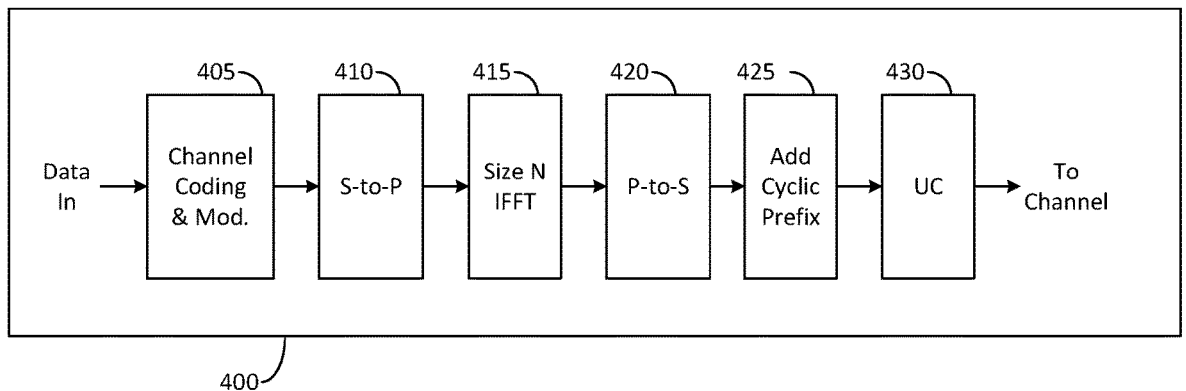
FIG. 4A illustrates a high-level diagram of an orthogonal frequency division multiple access transmit path according to embodiments of the present disclosure.
Figure 4B:
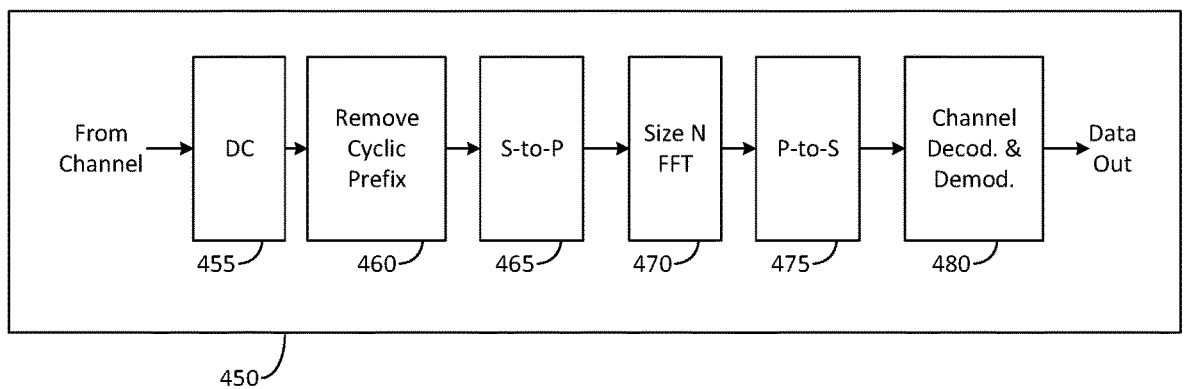
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at the gNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIB s that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is an RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
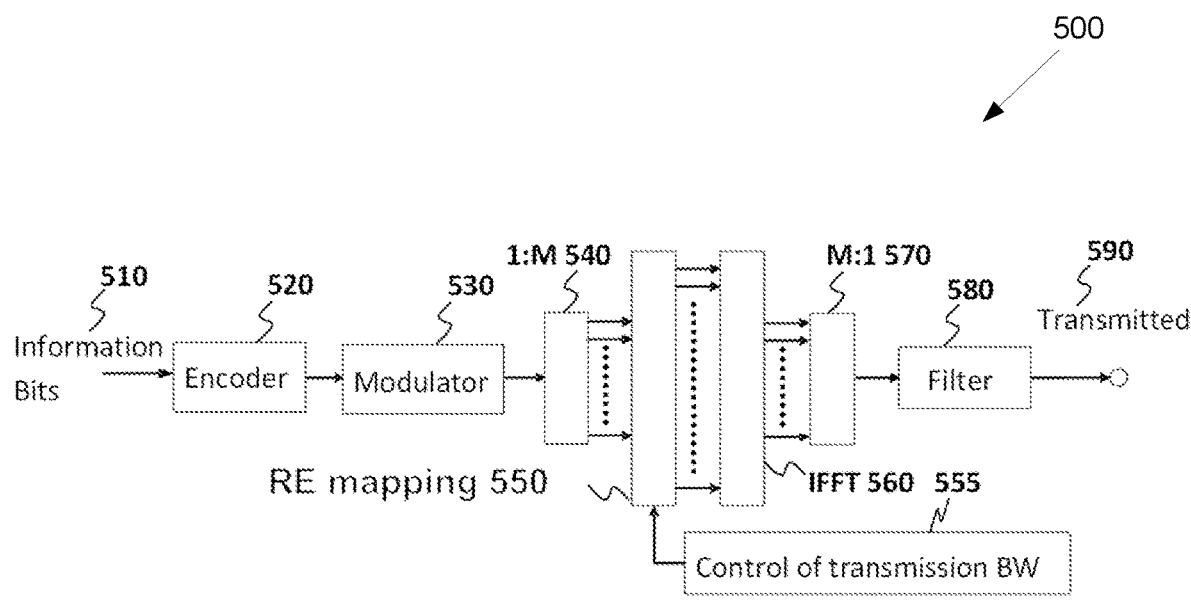
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. FIG. 5 does not limit the scope of the present disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
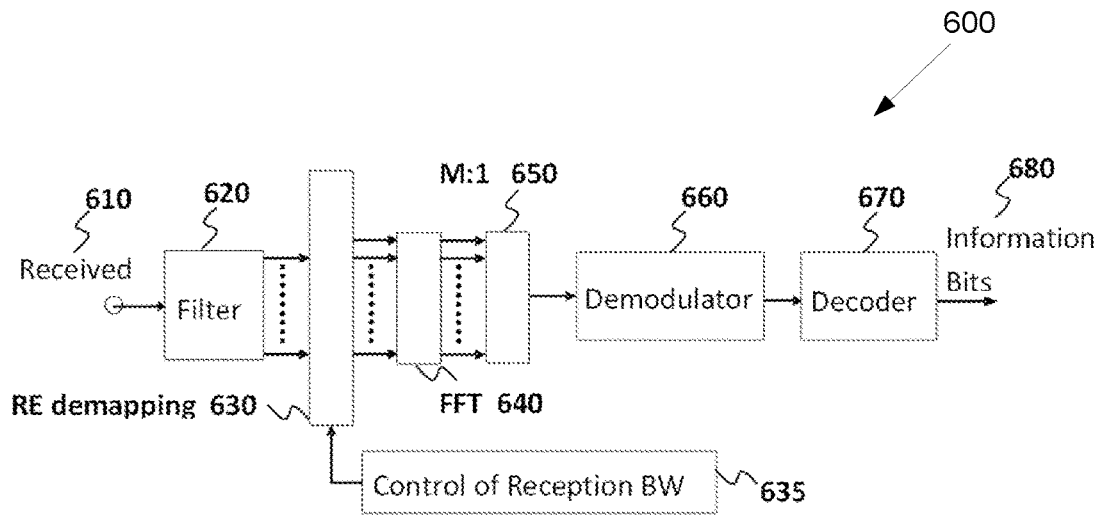
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. FIG. 6 does not limit the scope of the present disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
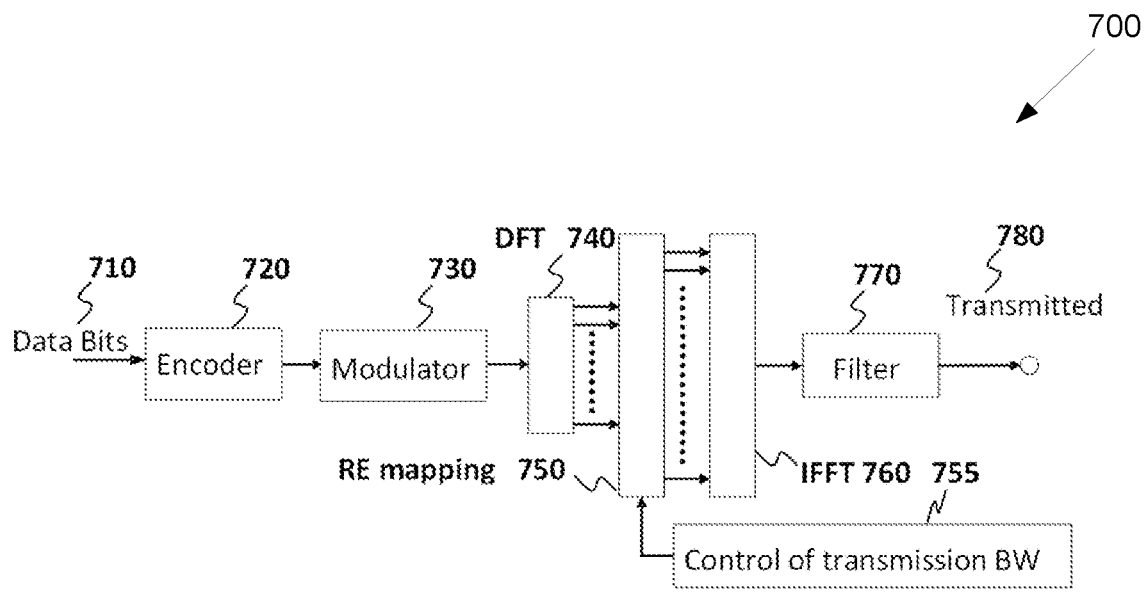
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. FIG. 7 does not limit the scope of the present disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
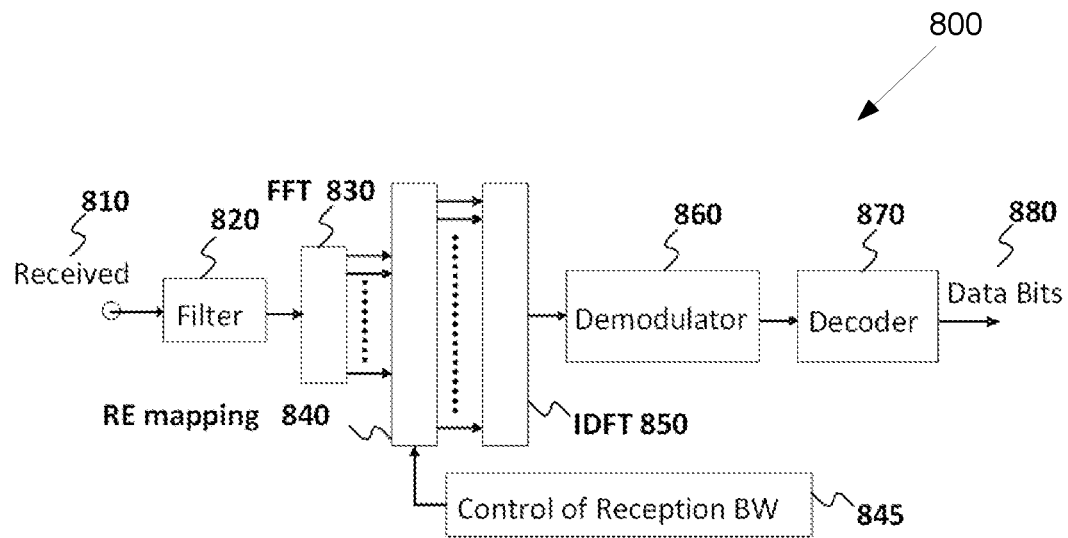
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. FIG. 8 does not limit the scope of the present disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth-generation cellular system, a system capable of operating at sub-6 GHz and above-6 GHz (for example, in mmWave regime) becomes one of the requirements. In 3GPP TR 22.891, 74 5G use cases has been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km$^2$ with less stringent the reliability, data rate, and latency requirements.

In order for the 5G network to support such diverse services with different quality of services (QoS), one method has been identified in 3GPP specification, called network slicing. To utilize PHY resources efficiently and multiplex various slices (with different resource allocation schemes, numerologies, and scheduling strategies) in DL-SCH, a flexible and self-contained frame or subframe design is utilized.

The BS may schedule the UE and determine the precoder and MCS for the UE in any time-frequency resource. For those time-frequency resource for which the BS does not have SRS channel estimates, the BS may use previously sampled or outdated SRS channel estimates as the CSI necessary for precoding decision. This method is working fine when there is no user mobility, but this method may degrade performance severely when there is user mobility.

The present disclosure provides methods to "predict" CSI for those time-frequency resources for which no SRS channel estimates are available. For the prediction of the CSI, it may be provided that the BS uses the previously collected SRS channel estimates, based on a prediction model. The prediction model could be parameterized; and the channel prediction parameters are updated when the fresh SRS arrives.

Figure 9:
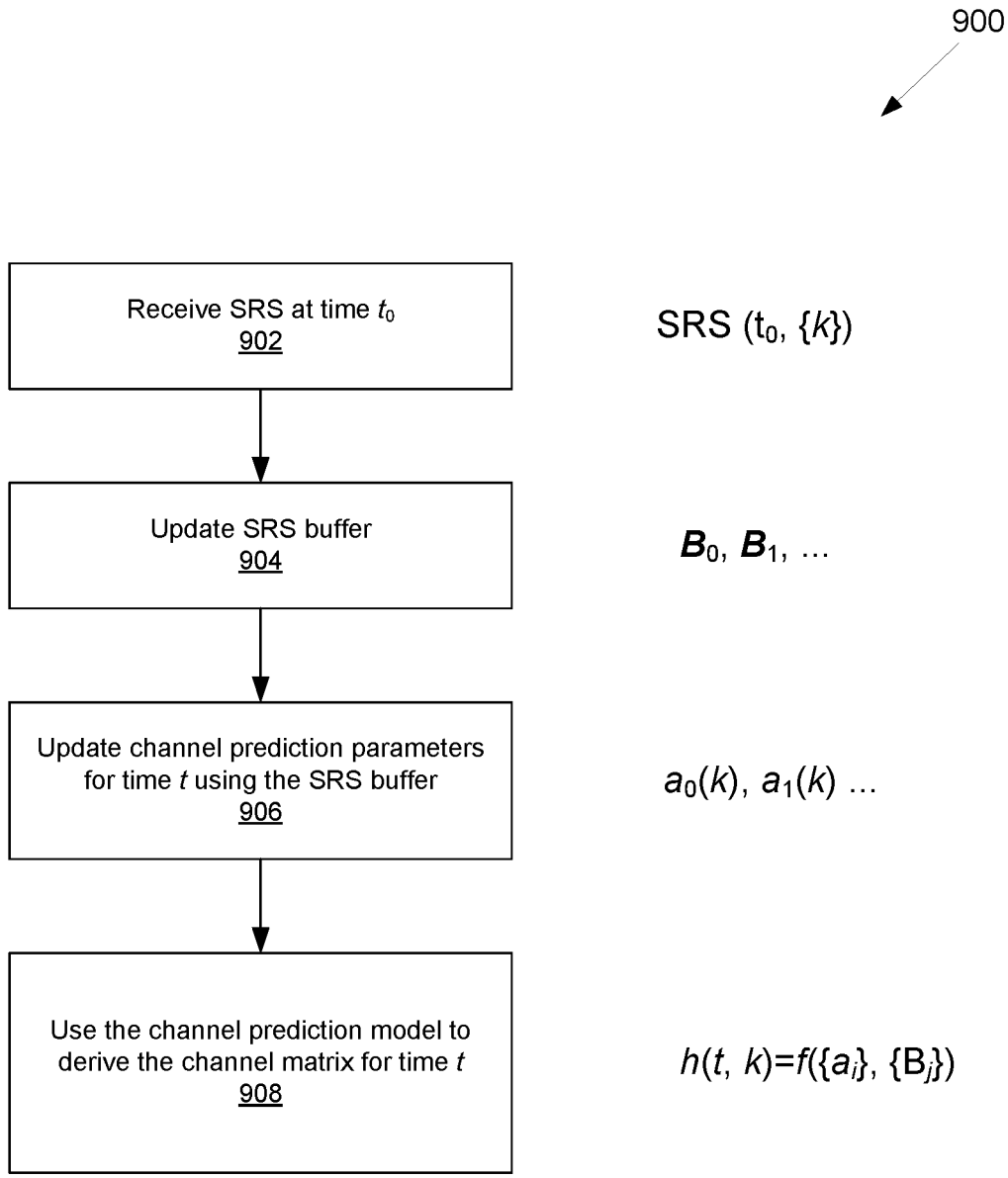
FIG. 9 illustrates an example a channel prediction according to embodiments of the present disclosure.

FIG. 9 illustrates an example a channel prediction 900 according to embodiments of the present disclosure. The embodiment of the diagram 900 illustrated in FIG. 9 is for illustration only. FIG. 9 does not limit the scope of the present disclosure to any particular implementation.

As illustrated in FIG. 9, at time $t_0$ the BS in step 902 receives SRS for frequency resources. For each frequency resource k for which a new SRS data has arrived, the BS in step 904 updates the SRS buffer and store the SRS in the memory. The SRS buffer contains a sequence of SRS channel estimates $\{B_0, B_1, \ldots\}$.

In step 906, the BS updates channel prediction parameters $\{a_0, a_1, \ldots\}$ according to a selected channel prediction model, using the sequence of the SRS channel estimates. For this update, the old channel prediction parameters are also used as input.

For time t, where $t > t_0$, the BS in step 908 derives channel on each frequency resource k, using the channel prediction model. The channel prediction model can take at least one of $\{B_0, B_1, \ldots\}$ and $\{a_0, a_1, \ldots\}$ as input.

The SRS buffer contains a sequence of SRS channel estimates $\{B_0, B_1, \ldots\}$. Each $B_i$ may comprise SRS matrices for multiple frequency resources $\{k\}$, wherein i is a time index. For example: $B_i = [B_{i,k}]_{k \in W}$, where W is the SRS BW, comprising a number of frequency resource indices.

In one embodiment, a UE is configured to transmit SRS every T msec in a same SRS BW, $W_0$. In this case, the same SRS BW corresponds to W, i.e., $W_0 = W$, and the SRS buffer is updated for every k in W.

In another embodiment, a UE is configured to transmit SRS every T msec in different SRS subbands. For example, a BS configures 4 SRS subbands, $W_1, W_2, W_3$ and $W_4$, and $W = W_1 \cup W_2 \cup W_3 \cup W_4$. When a BS receives SRS for a UE in $W_s$, $s \in \{1,2,3,4\}$, the SRS buffer is updated for every k in $W_s$, and stays the same for k in $W_{s'\neq s}$, $s' \in \{1,2,3,4\}$.

The SRS buffer contents for a time index i in this case comprises 4 chunks of data, $B_{i,W_1}, B_{i,W_2}, B_{i,W_3}$ and $B_{i,W_4}$, corresponding to the four SRS subbands.

Figure 10:
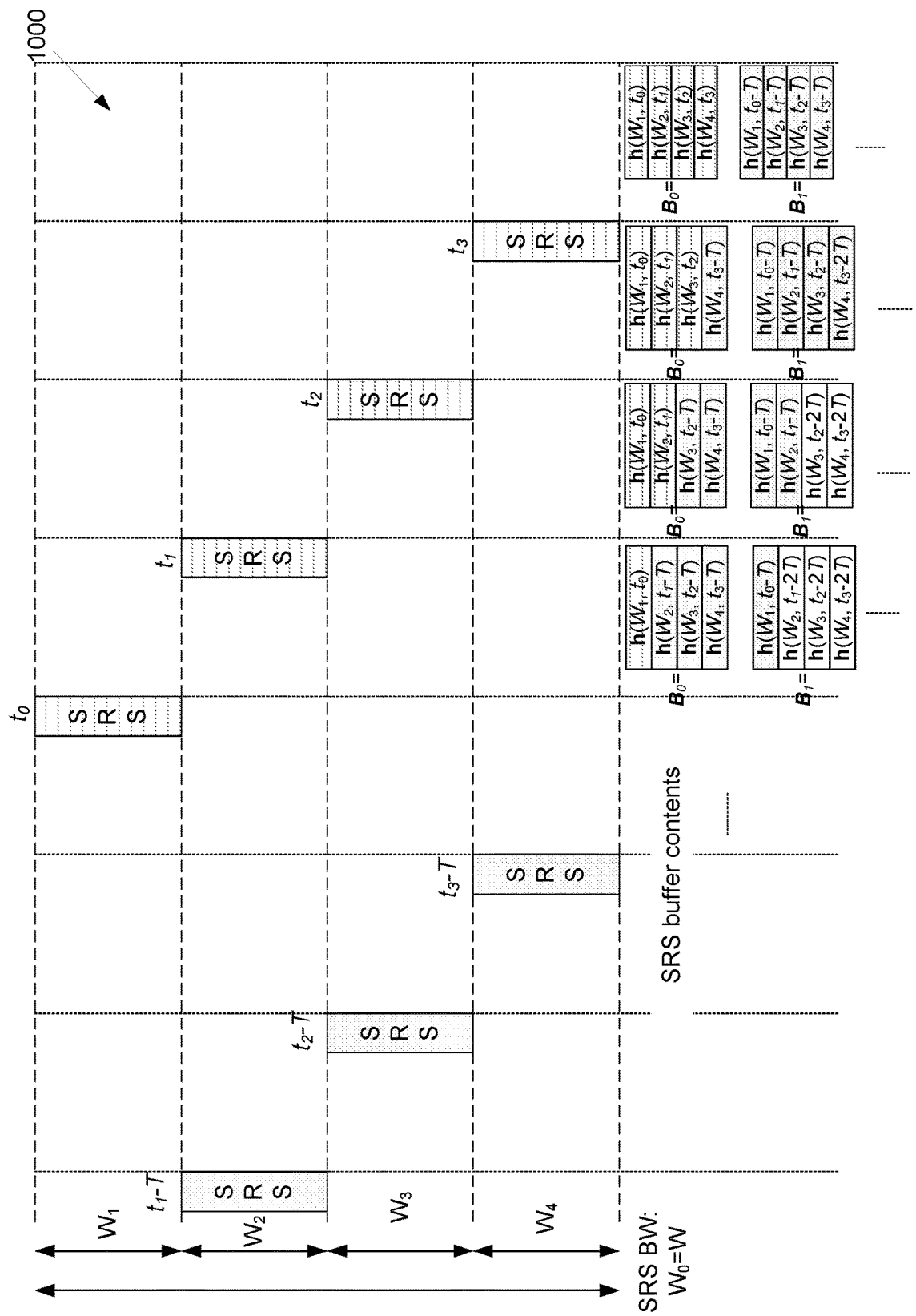
FIG. 10 illustrates an example an SRS buffer update according to embodiments of the present disclosure.

FIG. 10 illustrates an example an SRS buffer update 1000 according to embodiments of the present disclosure. The embodiment of the SRS buffer update 1000 illustrated in FIG. 10 is for illustration only. FIG. 10 does not limit the scope of the present disclosure to any particular implementation.

As illustrated in FIG. 10, the new SRS arrives every T msec in each of the SRS subbands, $W_1, W_2, W_3$ and $W_4$.

The new SRS arrives at $t_0, t_1, t_2$ and $t_3$ respectively for SRS subbands $W_1, W_2, W_3$ and $W_4$, where $t_1 = t_0 + S$, $t_2 = t_0 + 2S$ and $t_2 = t_0 + 3S$, and T=4S.

When the new SRS arrives at time $t_0$ for SRS subband $W_1$, the SRS buffer for the subband $W_1$ is updated with the newly arrived SRS channel estimates. The $W_1$ portion of the $B_0$, i.e., $B_{0,W_1}$, is updated with the new SRS estimates in the SRS subband, i.e., $h(W_1, t_0)$, and the $W_1$ portion of the $B_1$, i.e., $B_{1,W_1}$, is updated with the previous SRS estimates in the SRS subband, i.e., $h(W_1, t_0 - T)$. The SRS buffer for each of the subbands are updated similarly when the SRS in the subband newly arrives.

Figure 11:
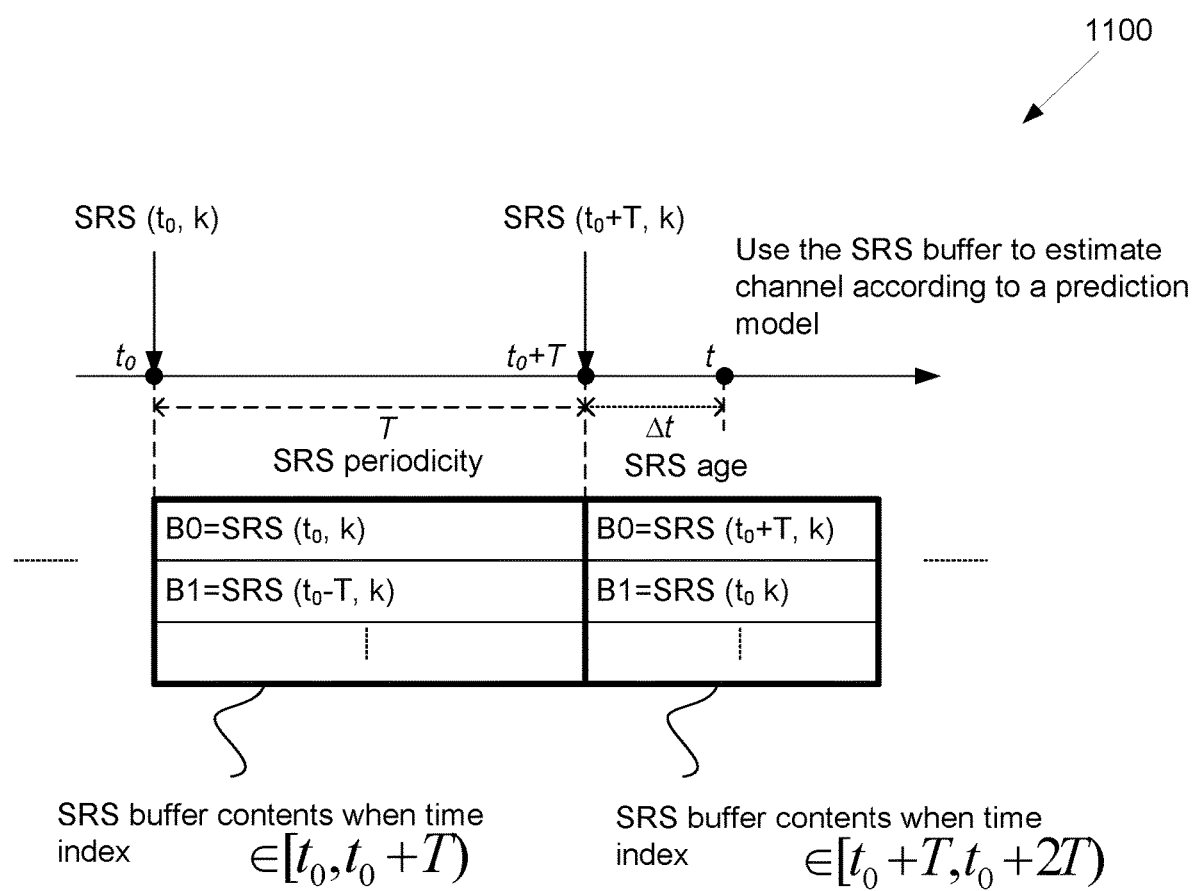
FIG. 11 illustrates an example an SRS buffer update according to embodiments of the present disclosure.

FIG. 11 illustrates an example an SRS buffer update 1100 according to embodiments of the present disclosure. The embodiment of the SRS buffer update 1100 illustrated in FIG. 11 is for illustration only. FIG. 11 does not limit the scope of the present disclosure to any particular implementation.

When a fresh/new SRS arrives at time $t_0$ for BW $W_s$, the SRS buffer is updated for the BW $W_s$. The updated SRS buffer is used until another fresh SRS arrives at time $t_0 + T$. In one example, the SRS buffer is a first-in-first-out (FIFO) buffer. The top of the buffer contains the most recent SRS sample, and the bottom contains the most outdated SRS sample. The buffer contains a sequence of SRS samples, {B0 (=SRS($t_0$, k)), B1 (=SRS($t_0 - T$, k)), ...}.

In another embodiment, the buffer contains a sequence of processed SRS samples, rather than raw SRS samples.

For time t, where $t_0 \leq t < t_0 + T$, the channel prediction model takes the SRS buffer $\{B_0, B_1, \ldots\}$, the channel prediction parameters $\{a_0, a_1, \ldots\}$, and SRS age, $\Delta t = t - t_0$, as input; and generates a channel estimate at time t on each frequency resource k.

Figure 12:
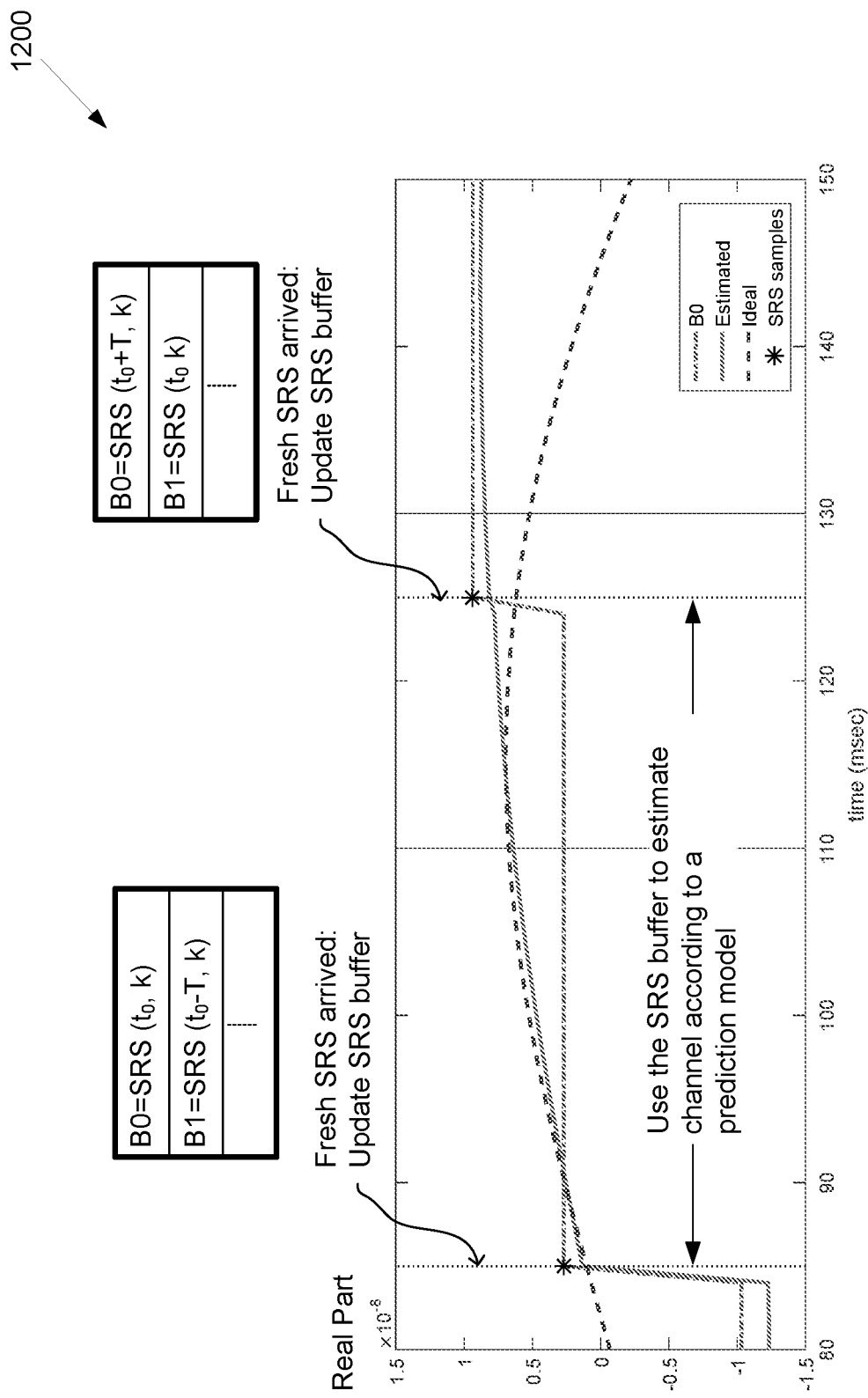
FIG. 12 illustrates an example a channel prediction according to embodiments of the present disclosure.

FIG. 12 illustrates an example a channel prediction 1200 according to embodiments of the present disclosure. The embodiment of the channel prediction 1200 illustrated in FIG. 12 is for illustration only. FIG. 12 does not limit the scope of the present disclosure to any particular implementation.

For time t, where $t > t_0$, the channel prediction model takes at least one of the sequence of SRS channel estimates $\{B_0, B_1, \ldots\}$ in the SRS buffer, the channel prediction parameters $\{a_0, a_1, \ldots\}$, and SRS age, $\Delta t = t - t_0$, as input; and generates a channel estimate at time t on each frequency resource k.

For time t, the channel prediction parameters are updated with taking at least one of the sequences of SRS channel estimates and SRS age, $\Delta t = t - t_0$ and the old channel prediction parameters as input.

In one embodiment, the channel for the time-frequency resource (t, k) is predicted using the previous SRS samples in the SRS buffer on the same frequency k only.

In one embodiment, the channel for the time-frequency resource (t, k) is predicted using the previous SRS samples in the SRS buffer on a set of frequency resources.

In one embodiment, the channel for the time-frequency resource (t, k) is predicted using the previous SRS samples in the SRS buffer on all the frequency resources in the SRS bandwidth.

Figure 13:
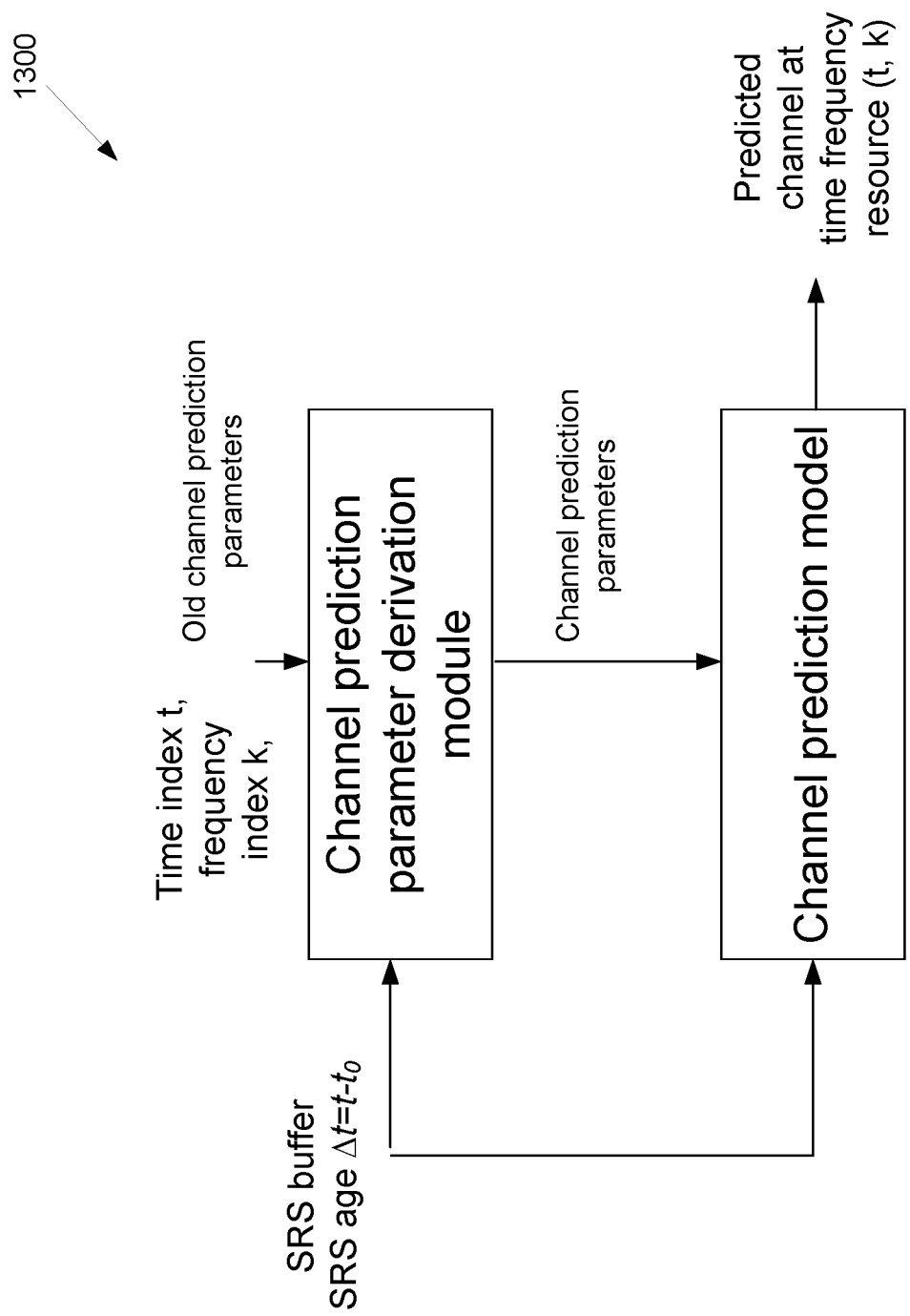
FIG. 13 illustrates an example data processing of channel prediction model according to embodiments of the present disclosure.

FIG. 13 illustrates an example data processing of channel prediction model 1300 according to embodiments of the present disclosure. The embodiment of the channel prediction model 1300 illustrated in FIG. 13 is for illustration only. FIG. 13 does not limit the scope of the present disclosure to any particular implementation.

An extrapolator is an example of the channel predictor and used for predicting the channel at time frequency resource (t, k), given the previous SRS channel estimates.

Figure 14:
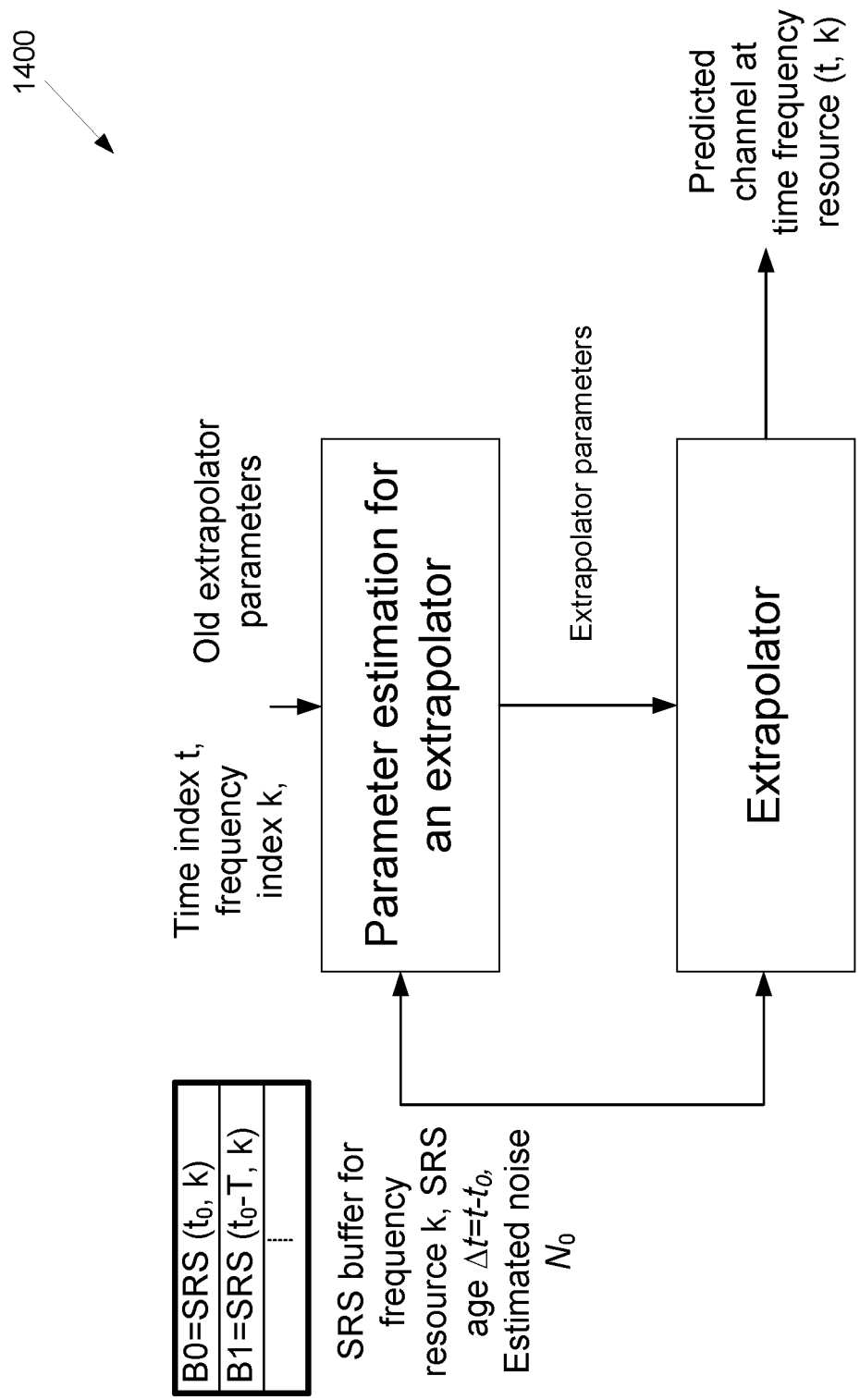
FIG. 14 illustrates an example parameter estimation for an extrapolator according to embodiments of the present disclosure.

FIG. 14 illustrates an example parameter estimation for an extrapolator 1400 according to embodiments of the present disclosure. The embodiment of the parameter estimation for an extrapolator 1400 illustrated in FIG. 14 is for illustration only. FIG. 14 does not limit the scope of the present disclosure to any particular implementation.

In one embodiment, the extrapolator is a polynomial extrapolator. The polynomial extrapolator takes past SRS samples collected in the SRS buffer as input and derives the polynomial coefficients to be used for the channel prediction. For example, when linear extrapolator is used as the channel predictor, the predicted channel at time t could be written as: $\hat{h}(t) = a_0 t + b$, where, $\hat{h}(t)$ is the predicted channel at time t; $B_0 = h(t_0)$ and $B_1 = h(t_0 - T)$ are the SRS channel estimates at time $t_0$ and $t_1 = t_0 - T$; and $a_0$, b are the coefficients derived for a line equation connecting two points in a cartesian coordinate $(t_0, B_0)$ and $(t_1, B_1)$: $a_0 = (B_0 - B_1)/(t_0 - t_1)$ and $b = B_0 - a_0 t_0$.

The linear extrapolator coefficients can alternatively be derived by applying a least-square fitting of the coefficients, with more than two samples, e.g., B0, B1, $B_2$, $B_3$, . . . in the SRS buffer.

Figure 15:
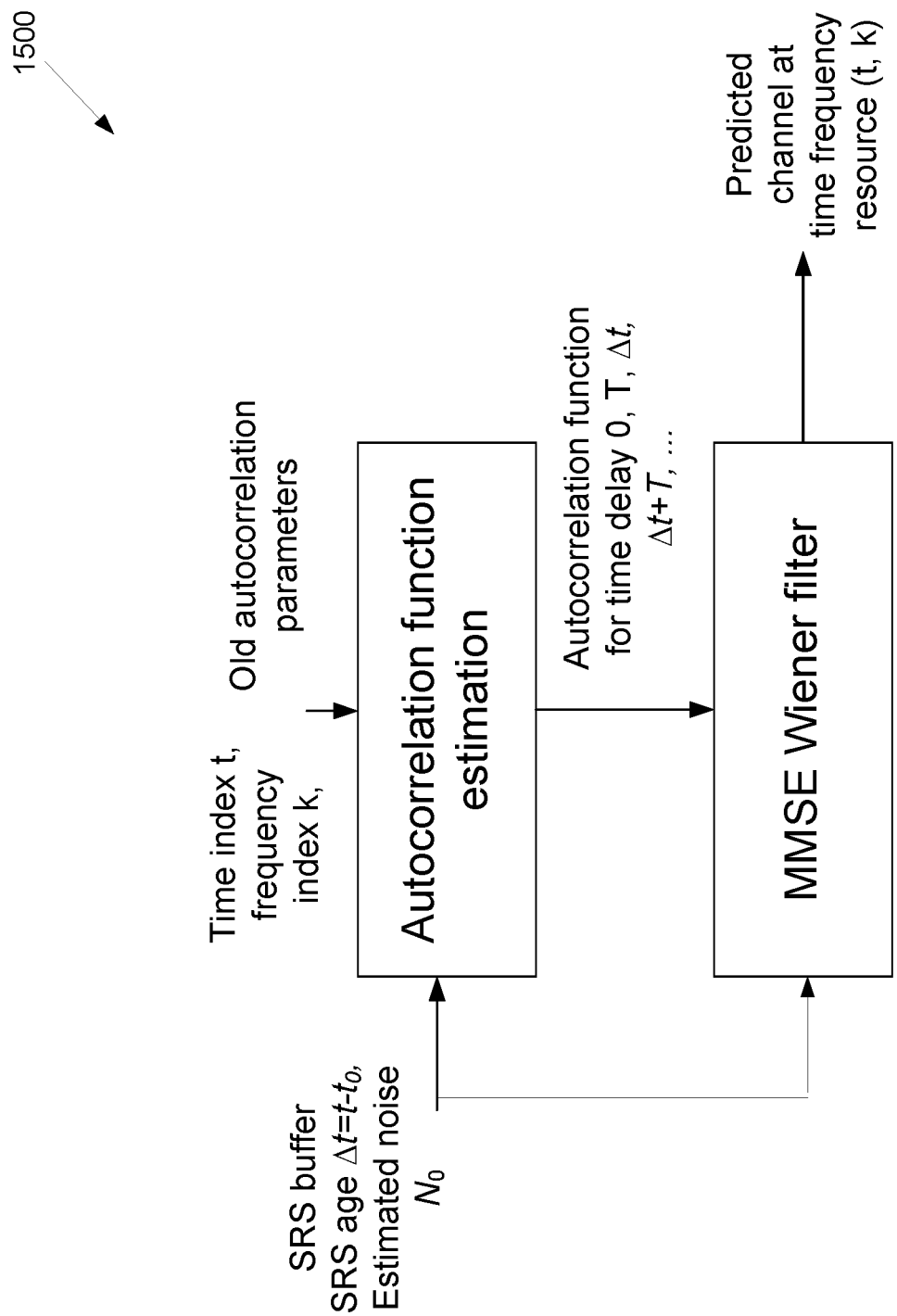
FIG. 15 illustrates an example parameter estimation for an MMSE Wiener filter according to embodiments of the present disclosure.

FIG. 15 illustrates an example parameter estimation for an MMSE Wiener filter 1500 according to embodiments of the present disclosure. The embodiment of the MMSE Wiener filter 1500 illustrated in FIG. 15 is for illustration only. FIG. 15 does not limit the scope of the present disclosure to any particular implementation.

An MMSE Wiener filter is an example of the channel predictor and used for predicting the channel at time frequency resource (t, k), given the SRS buffer.

In one embodiment, the channel for the time frequency resource (t, k) is predicted using the SRS samples in the SRS buffer on the same frequency k only.

For each antenna, the SRS channel estimate for the time frequency resource (t, k) is derived as $\hat{h}(t, k) = \sum_{i=0}^{N_{taps}-1} a_i(t-t_0, k) h(t_0 - iT, k)$.

For deriving the filter coefficients $\{a_i(\Delta t, k)\}$, a signal model is considered given by $y(t, k) = x(t, k) + n(t, k)$ where $x(t, k) = h(t, k)$ is the channel coefficient at time t frequency q, and $n(t, k)$ is an additive noise at time t frequency q.

According to the Wiener filter theory under the assumption of wide-sense stationary processes, the coefficients $\{a_i(\Delta t, k)\}$, $\Delta t = t - t_0$ is derived as $$\begin{bmatrix} a_0(\Delta t, k) \\ \vdots \\ a_{N_{taps}-1}(\Delta t, k) \end{bmatrix} = R_{yy}^{-1}(k) r_{xy}(\Delta t, k)$$

where: $R_{yy}(k) = \text{toeplitz}([r_{yy}(0, k)\ r_{yy}(T, k) \ldots r_{yy}((N_{taps}-1)T, k)]^t)$; $r_{yy}(\tau, k) = E(y(t, k)y^*(t-\tau, k)) = r_{xx}(\tau, k) + r_{nn}(\tau, k)$; $r_{xx}(\tau, k) = E(x(t, k)x^*(t-\tau, k))$; $r_{nn}(\tau, k) = E(n(t, k)n^*(t-\tau, k))$; and $r_{xy}(\Delta t, k) = r_{xx}(\Delta t, k) = [r_{xx}(\Delta t)\ r_{xx}(\Delta t+T) \ldots r_{xx}(\Delta t + (N_{taps}-1)T)]^t$.

When a further assumption of time-independent noise holds, $r_{nn}(\tau, k)$ can be derived given by $r_{nn}(\tau=0, k) = \sigma_n^2$, and $r_{nn}(\tau \neq 0, k) = 0$. In this case, $R_{yy}(k) = R_{xx}(k) + R_{nn}(k)$ where: $R_{xx}(k) = \text{toeplitz}([r_{xx}(0, k)\ r_{xx}(T, k) \ldots r_{xx}((N_{taps}-1)T, k)]^t)$ and $R_{nn}(k) = \text{diag}([\sigma_n^2, \sigma_n^2, \ldots, \sigma_n^2])$.

According to the analysis above, the matrix equation for the coefficients can be rewritten as $$\begin{bmatrix} a_0(\tau, k) \\ \vdots \\ a_{N_{taps}-1}(\tau, k) \end{bmatrix} = (R_{xx}(k) + R_{nn}(k))^{-1} (r_{xx}(\Delta t, k))$$

where in order to derive the coefficients $\{a_i(\Delta t, k)\}$, for $0 \leq \Delta t < T$, it is necessary to know $r_{xx}(\tau, k)$ for $0 \leq \tau < N_{taps}T$. One challenge is that empirically by time averaging of the observations y(t, k), it could get $r_{yy}(\tau, k)$ and correspondingly $r_{xx}(\tau, k)$ only for $\tau = 0, T, 2T, \ldots$, because SRS samples are sparsely available in time, owing to the periodic transmissions. For this challenge, one solution is to estimate $r_{xx}(\tau, k)$ for all $\tau$ with assuming an autocorrelation model.

Figure 16:
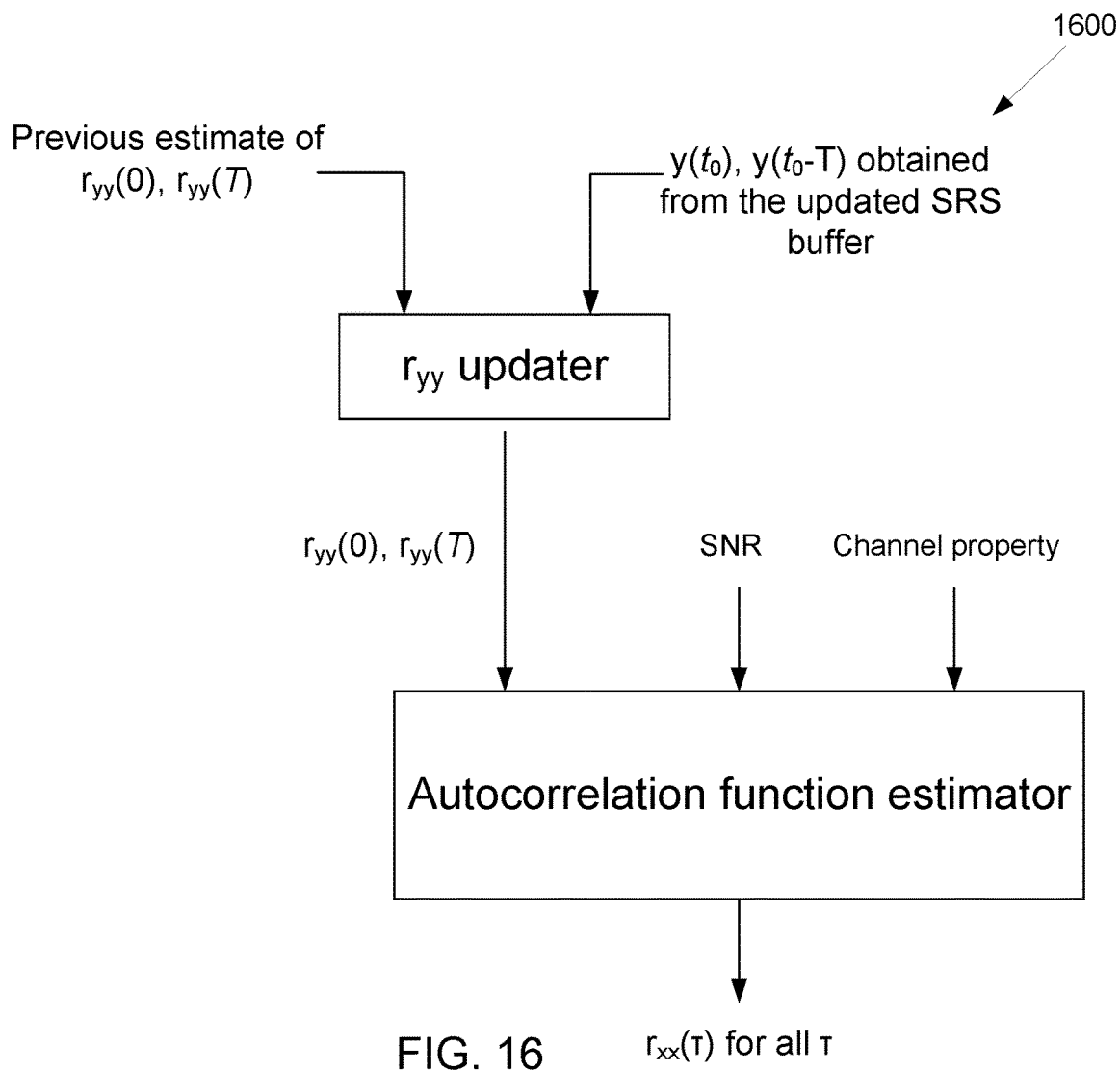
FIG. 16 illustrates an example input and output of autocorrelation estimator according to embodiments of the present disclosure.

FIG. 16 illustrates an example input and output of autocorrelation estimator 1600 according to embodiments of the present disclosure. The embodiment of the autocorrelation estimator 1600 illustrated in FIG. 16 is for illustration only. FIG. 16 does not limit the scope of the present disclosure to any particular implementation.

The autocorrelation function estimator explained in FIG. 15 takes inputs: at least one of empirical estimates of $r_{yy}(\tau=0, k)$ and $r_{yy}(\tau=T, k)$, and signal to noise ratio (SNR); and channel property of the link. Based on these inputs, the autocorrelation function estimator generates an output of $r_{xx}(\tau, k)$, for all $\tau$.

In one such embodiment, when $\tau=0$: $r_{xx}(\tau, k)$ is derived from $r_{yy}(\tau=0, k)$, according to $$r_{yy}(\tau = 0, k) = r_{xx}(\tau = 0, k)\left(1 + \frac{1}{SNR}\right).$$

When $\tau \neq 0$: $r_{xx}(\tau, k) = r_{yy}(\tau, k)$, and $r_{yy}(\tau, k) = r_{xx}(\tau, k)$.

In addition, $r_{yy}(\tau, k)$ values for $\tau=0$ and $\tau=T$ are updated when the SRS buffer is updated (or when new SRS arrives). The updated $r_{yy}(\tau, k)$ values are determined with taking the previous estimates of $r_{yy}(\tau=0, k)$, $r_{yy}(\tau=T, k)$, $y(t_0, k)$ and $y(t_0-T, k)$ as input.

In some embodiments, the autocorrelation model is selected dependent upon the channel property of the link. The channel property could include "isotropic scattering," "single-ray line of sight (LOS)," and "angle-limited scattering." In the below description of the autocorrelation functions, frequency index k is omitted for simplicity.

With isotropic scattering, the autocorrelation model is $r_{xx}(\tau)=\text{sinc}(2f_w\tau)$. For this model, one parameter, $f_w$, corresponding to maximum Doppler or Doppler spread, needs to be estimated.

With single-ray LOS, the autocorrelation model is $r_{xx}(\tau)=r_{xx}(0)e^{j2\pi f_D\tau}$ where $f_D=f_{max}\cos\theta$. For this model, Doppler frequency $f_D$ needs to be estimated.

With angle-limited scattering condition, the autocorrelation model is $r_{xx}(\tau)=r_{xx}(0)e^{j2\pi f_D\tau}\text{sinc}(2f_w\tau)$.

Figure 17:
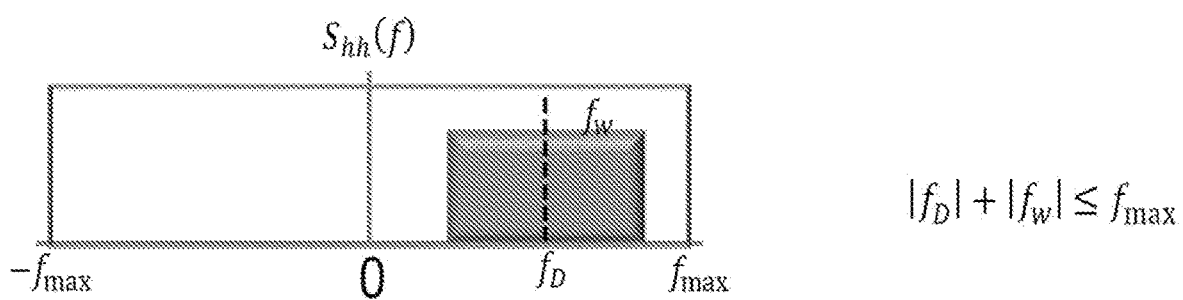
FIG. 17 illustrates an example power spectral density according to embodiments of the present disclosure.

FIG. 17 illustrates an example power spectral density 1700 according to embodiments of the present disclosure. The embodiment of the power spectral density 1700 illustrated in FIG. 17 is for illustration only. FIG. 17 does not limit the scope of the present disclosure to any particular implementation.

The power spectral density $S_{xx}(f)=S_{hh}(f)$ of this model is depicted in FIG. 17.

For this model, at least one of Doppler frequency $f_D$ and Doppler spread $f_w$ need to be estimated.

It is noted that the angle-limited scattering model is a generalization of the previous two models, i.e., isotropic scattering and single-ray LOS. By setting $f_D=0$, the model reduces to the isotropic scattering. By setting $f_w=0$, the model reduces to the single-ray LOS.

When adopting one of those autocorrelation models, Doppler frequency $f_D$ and Doppler spread $f_w$ can be estimated using the empirical autocorrelations of $r_{xx}(\tau, k)$ only for $\tau=0, T, 2T, \ldots$.

In one embodiment, the Doppler frequency and spread are estimated by $$\hat{f}_W(k) = \frac{1}{2T}\text{sinc}^{-1}\left(\frac{|r_{xx}(T, k)|}{r_{xx}(0, k)}\right) \text{ and}$$

$$\hat{f}_D(k) = \frac{1}{2\pi T}\text{Phase}(r_{xx}(T, k)).$$

In one embodiment, the Doppler frequency and spread values are estimated by performing least square parameter search between the sinc function $r_{xx}(\tau, k)=r_{xx}(0, k)e^{j2\pi f_D\tau}\text{sinc}(2f_w\tau)$ and the empirical autocorrelation values of $r_{xx}(\tau, k)$ for $\tau=0, T, 2T$.

As seen from the equation above, the two parameters, i.e., the Doppler frequency and spread values, are estimated using empirical estimate of $r_{xx}(0, k)$ and $r_{xx}(T, k)$.

Figure 18:
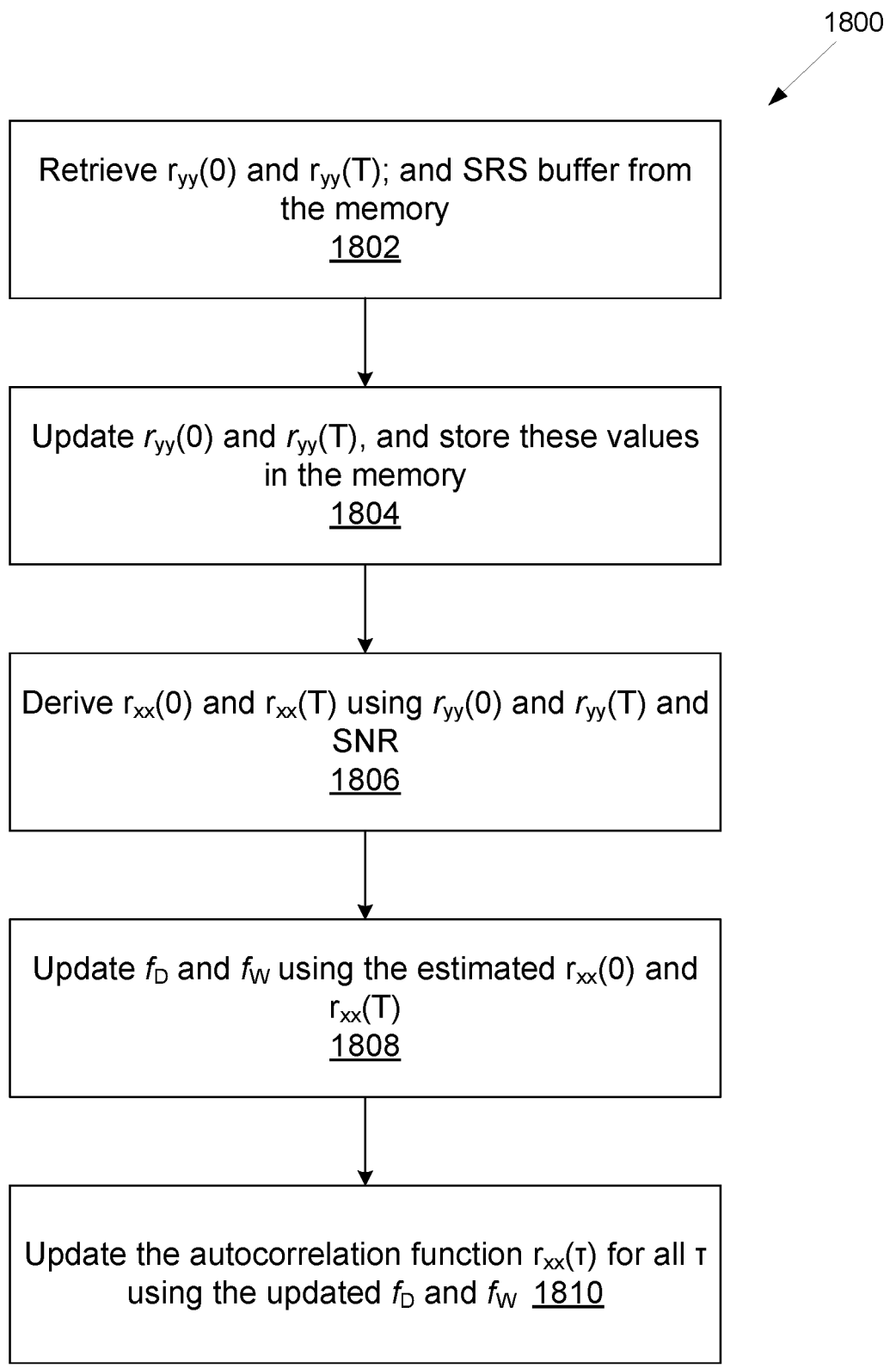
FIG. 18 illustrates an example autocorrelation function according to embodiments of the present disclosure.

FIG. 18 illustrates an example autocorrelation function 1800 according to embodiments of the present disclosure.

The embodiment of the autocorrelation function 1800 illustrated in FIG. 18 is for illustration only. FIG. 18 does not limit the scope of the present disclosure to any particular implementation.

FIG. 18 illustrates the steps to update the autocorrelation function $r_{xx}(\tau, k)$ for all $\tau$ when new SRS samples arrives according to some embodiments of the present disclosure. It is noted that these embodiments may also be used for the autocorrelation function estimator illustrated in FIG. 15.

Previous estimates of $r_{yy}(0, k)$ and $r_{yy}(T, k)$ are stored in the memory. For each UE, initial values can be assigned to those estimates: $r_{yy}(0, k)=\alpha_0$ and $r_{yy}(T, k)=\alpha_T$.

As illustrated in FIG. 18, the autocorrelation function 1800, in step 1802, retrieves $r_{yy}(0)$ and $r_{yy}(T)$; and SRS buffer from the memory. In step 1804, the autocorrelation function 1800 updates $r_{yy}(0)$ and $r_{yy}(T)$ and stores these values in the memory. In step 1806, the autocorrelation function 1800 derives $r_{xx}(0)$ and $r_{xx}(T)$ using $r_{yy}(0)$ and $r_{yy}(T)$ and SNR. In step 1808, the autocorrelation function 1800 updates $f_D$ and $f_W$ using the estimated $r_{xx}(0)$ and $r_{xx}(T)$. Finally, in step 1810, the autocorrelation function 1800 updates the autocorrelation function $r_{xx}(\tau)$ for all $\tau$ using the updated $f_D$ and $f_W$.

In some embodiments, the autocorrelation values are stored per antenna per frequency resource: $r_{yy}(0, k, s)$ and $r_{yy}(T, k, s)$, where $r_{yy}(0, k)$ and s is an antenna index. In some embodiments, the autocorrelation values are stored per antenna with averaging across frequency resources: $r_{yy}(0, s)$ and $r_{yy}(T, s)$. In some embodiments, the autocorrelation values are stored per frequency resource with averaging across antennas: $r_{yy}(0, k)$ and $r_{yy}(T, k)$.

In some embodiments, the autocorrelation values are stored with averaging across both antennas and frequency resources: $r_{yy}(0)$ and $r_{yy}(T)$. The memory size required for the channel prediction is dependent upon the option chosen here.

In one embodiment of Step 1, retrieve previous estimates of $r_{yy}(0, k)$ and $r_{yy}(T, k)$ and SRS buffer from the memory.

In one embodiment of Step 2, when new SRS arrives at time to for the frequency resource k, update the autocorrelation values according to $$r_{yy}(0, k) \leftarrow \frac{N-1}{N}r_{yy}(0, k) + \frac{1}{N}y(t_0, k)y^*(t_0, k) \text{ and}$$

$$r_{yy}(T, k) \leftarrow \frac{N-1}{N}r_{yy}(T, k) + \frac{1}{N}y(t_0, k)y^*(t_0 - T, k).$$

Store the updated autocorrelation values in the memory.

In one embodiment of Step 3, $r_{xx}(0, k)$ and $r_{xx}(T, k)$ are derived from $r_{yy}(0, k)$ and $r_{yy}(T, k)$ and SNR S, according to $$r_{xx}(0, k) = \frac{r_{yy}(0, k)}{(1 + 1/S)} \text{ and } r_{xx}(T, k) = r_{yy}(T, k).$$

In one embodiment of Step 4, update the autocorrelation parameters $f_D$ and/or $f_w$, using the estimated $r_{xx}(0, k)$ and $r_{xx}(T, k)$.

In one embodiment of Step 5, update the autocorrelation function $r_{xx}(\tau, k)$ for all $\tau$, using the updated autocorrelation parameters $f_D$ and/or $f_w$.

In one example, in Step 1, the initial values can be determined with considering the typical values of $\hat{f}_W(k)$ and $\hat{f}_D(k)$ in the deployment environment.

In one example, in Step 2, N is an integer. In one instance, N is a constant; in another method N is a counter counting the number of SRS samples collected for frequency resource k for the UE.

When a BS has multiple antennas, the averaging over antennas can be conducted to derive the autocorrelation parameters $\hat{f}_W(k)$ and $\hat{f}_D(k)$. Suppose that Step 2 gives $r_{yy}(0, k, s)$ and $r_{yy}(T, k, s)$ for BS antenna s.

In one example, $r_{xx}(0, k, s)$ and $r_{xx}(T, k, s)$ and also $\hat{f}_W(k, s)$ and $\hat{f}_D(k, s)$ are separately derived per BS antenna s per frequency resource k, and MMSE is applied per antenna per frequency resource with different autocorrelation functions generated with these parameters. This may require as many matrix inversions as the product of the number of BS antennas and the number of frequency resources.

In another example, averages are taken over antenna dimension to derive a common $r_{yy}(0, k)$ and $r_{yy}(T, k)$ to derive common $\hat{f}_W(k)$ and $\hat{f}_D(k)$ across all the antennas, according to $$r_{yy}(0, k) = \frac{1}{N_{Tx}} \sum_{s \in \{1,\ldots,N_{Tx}\}} r_{yy}(0, k, s) \text{ and}$$

$$r_{yy}(T, k) = \frac{1}{N_{Tx}} \sum_{s \in \{1,\ldots,N_{Tx}\}} r_{yy}(T, k, s).$$

Also, in some embodiments, averaging over frequency resources can be conducted to derive the autocorrelation parameters $\hat{f}_W(k)$ and $\hat{f}_D(k)$.

In one example, averages are taken over all the frequency resources in a SRS subband $W_x$, to derive a common $r_{yy}(0)$ and $r_{yy}(T)$ to derive common $\hat{f}_W$ and $\hat{f}_D$ across the frequency resources in the SRS subband $W_x$, according to $$r_{yy}(0, k) = \frac{1}{|W_x|} \sum_{k \in W_x} r_{yy}(0, k) \text{ and}$$

$$r_{yy}(T, k) = \frac{1}{|W_x|} \sum_{s \in W_x} r_{yy}(T, k).$$

In one example, the averages are taken over both the frequency resources and Tx antennas.

One of the main benefits of these averaging embodiment/examples is memory saving. By taking the averages every time resource for which the new SRS arrives, the BS does not need to store all the values of $r_{yy}(0, k)$ and $r_{yy}(T, k)$ related to e.g., Tx antennas and frequency resources, but store averaged values only.

In some embodiments, the averaging over frequency resources and/or Tx antennas happen after taking the ratio $$\frac{|r_{xx}(T, k, s)|}{r_{xx}(0, k, s)}.$$

For example, when taking the average over antennas according to this method, the per-frequency resource $\hat{f}_W(k)$ is obtained according to $$\hat{f}_W(k) = \frac{1}{2T} \text{sinc}^{-1}\left(\frac{1}{N_{Tx}} \sum_{s=1}^{N_{Tx}} \frac{|r_{xx}(T, k, s)|}{r_{xx}(0, k, s)}\right).$$

In some embodiments, the averaging over frequency resources and/or Tx antennas happen after deriving antenna and frequency specific $\hat{f}_W(k, s)$. For example, when taking the average over antennas according to this method, the per-frequency resource $\hat{f}_W(k)$ is obtained according to $$\hat{f}_W(k) = \frac{1}{N_{Tx}} \sum_{s=1}^{N_{Tx}} \frac{1}{2T} \text{sinc}^{-1}\left(\frac{|r_{xx}(T, k, s)|}{r_{xx}(0, k, s)}\right).$$

In another embodiment, the extrapolator is based on a sum of basis waveforms. One example in the present disclosure is to use P sinusoidal waveforms indexed by p=1, 2, . . . , P. Waveform p is parameterized by signal delays $\tau_p$ and signal Doppler shifts $v_p$, which span both the time and frequency domain. This sinusoidal extrapolator also takes past SRS samples in the SRS buffer as the input, and derives signal delays, Doppler shifts and combining weights $\gamma_p$. Then, the predicted channel at time t and frequency $f_k$ is a linear combination of the P basis waveforms $\hat{h}(t, k) = \sum_{p=1}^{P} \gamma_p e^{-j2\pi(f_k\tau_p - tv_p)}$.

A vectorized signal model for SRS measurement is provided. If the vectorization of $\hat{h}(t, k)$ performs first along the frequency domain and secondly along the time domain, the following function are provided given by $s(\tau, v, \gamma) = \text{vec}\{\hat{h}(t, k)\} = B(\tau, v)\cdot\gamma = B_2(\tau, v) \diamond B_1(\tau)\cdot\gamma$, where parameter vectors $\tau, v \in \mathbb{R}^P$, and path weights $\gamma \in \mathbb{C}^P$. Also, operator $\diamond$ represents Khatri-Rao product, which is a column-wise Kronecker product.

An example of the Khatri-Rao product between two 2×2 matrices is given by A $\diamond$ $$B = \begin{bmatrix} a_{11} & a_{12} \\ a_{21} & a_{22} \end{bmatrix} \diamond \begin{bmatrix} b_{11} & b_{12} \\ b_{21} & b_{22} \end{bmatrix} = \begin{bmatrix} a_{11}b_{11} & a_{12}b_{12} \\ a_{11}b_{21} & a_{12}b_{22} \\ a_{21}b_{11} & a_{22}b_{12} \\ a_{21}b_{21} & a_{22}b_{22} \end{bmatrix}$$

where $B_1(\tau)$ is a matrix-valued function, $\mathbb{R}^P \to \mathbb{C}^{M_f \times P}$, where $M_f$ is the number of tones (subcarriers) in a subband. It represents the intra-subband SRS frequency response due to path delay, and p-th column can be expressed by $[B_1(\tau)]_p = e^{-j2\pi x_1 \delta_f \tau_p}$ where $$x_1 = \left[-\left\lfloor\frac{M_f}{2}\right\rfloor, -\left\lfloor\frac{M_f}{2}\right\rfloor + 1, \ldots, \left(\left\lceil\frac{M_f}{2}\right\rceil - 1\right)\right]^T \cdot \delta_f$$

denotes the frequency spacing of resource blocks (RB).

Similarly, $B_2(\tau, v)$ is also a matrix-valued function. In one embodiment, where SRS is updated for the whole bandwidth every $\Delta t$ seconds. $B_2(\ )$ represents the phase rotation of SRS over time and is purely a function of Doppler v. In another embodiment where SRS is updated on a fraction of the total bandwidth every $\Delta t$ seconds, $B_2(\ )$ represents the inter-subband SRS response over time, which depends on both delay $\tau$ and Doppler v.

The input and output mapping of $B_2(\tau, v)$ is $(R^P, R^P) \to C^{N_{srs} \times P}$. $N_{srs}$ is the number of SRS subbands to be processed in the buffer. The p-th column can be expressed by $[B_2(\tau, v)]_p = e^{-j2\pi(m\Delta f \tau_p - n\Delta t v_p)}$ where m and n are frequency and time index sequences of subband SRS to be processed in the buffer. Both m and n are of length $N_{srs}$, which is an adaptive system parameter.

In one embodiment, $N_{srs}$ is equal to $N_{subband}$, i.e. the number of subband hops. For example, $N_{subband}=4$ in FIG. 10. In another embodiment, $N_{srs}$ can be a multiple of $N_{subband}$, which helps increase the processing SNR and improve robustness against the low SNR scenario.

In another embodiment, the vector signal model for SRS is extended to consider multiple eNB antennas. It may be assumed that path delays and Dopplers are common across $N_{ant}$ antennas. In such case, $s(\tau, v, \gamma) = \Gamma \diamond B_2(\tau, v) \diamond B_1(\tau) \cdot 1$ where $\Gamma$ is a path weight matrix with dimension $N_{ant} \times P$, and each row of $\Gamma$ contains path weights for one antenna. 1 stands for an all-one column vector with dimension P×1.

In one embodiment, SRS is corrupted with additive white Gaussian noise, the noisy SRS is given by $y_{srs} = s(\tau, v, \gamma) + n_0$ where $n_0$ is the noise vector and follows a zero-mean complex Gaussian distribution with a covariance matrix $N_0 I$.

Figure 19:
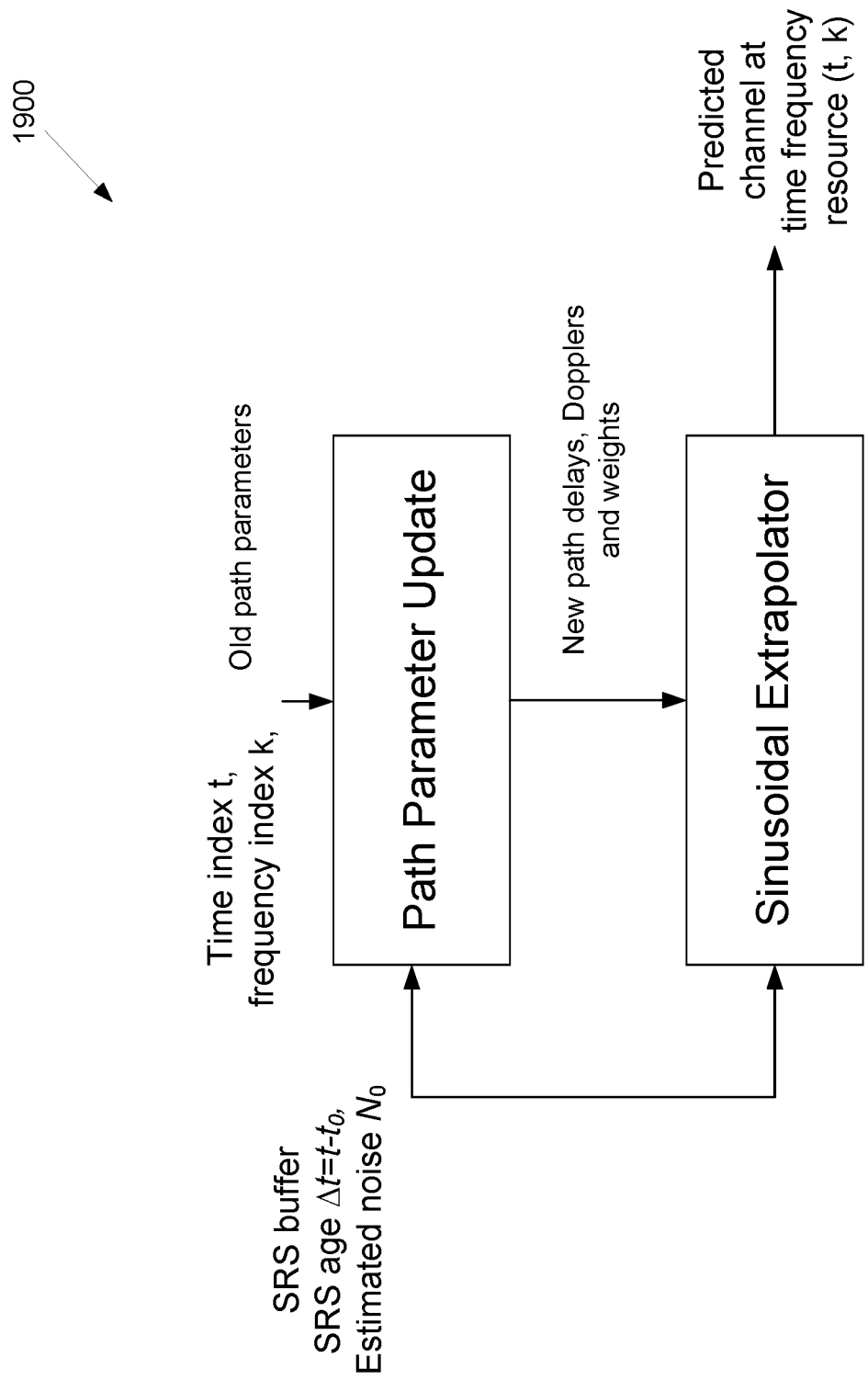
FIG. 19 illustrates an example parameter estimation for a sinusoidal extrapolator according to embodiments of the present disclosure.

FIG. 19 illustrates an example parameter estimation for a sinusoidal extrapolator 1900 according to embodiments of the present disclosure. The embodiment of the parameter estimation for a sinusoidal extrapolator 1900 illustrated in FIG. 19 is for illustration only. FIG. 19 does not limit the scope of the present disclosure to any particular implementation.

In one embodiment, the process related with path parameter update is implemented based on a maximum-likelihood estimator (MLE), which aims to find path parameters $\theta$ that maximize the likelihood probability.

$$\theta(t) = [\tau; v; \gamma]^T = \underset{\theta}{\arg\max}\, P_r(y_{srs}(t) | \theta)$$

where $y_{srs}(t)$ represents the vectorized SRS measurement stored in the buffer at time t.

In one embodiment, the MLE is implemented by jointly processing SRS across three different dimensions, which are time, frequency and antenna. It may be called as a method 3D-ML for brevity.

Figure 20:
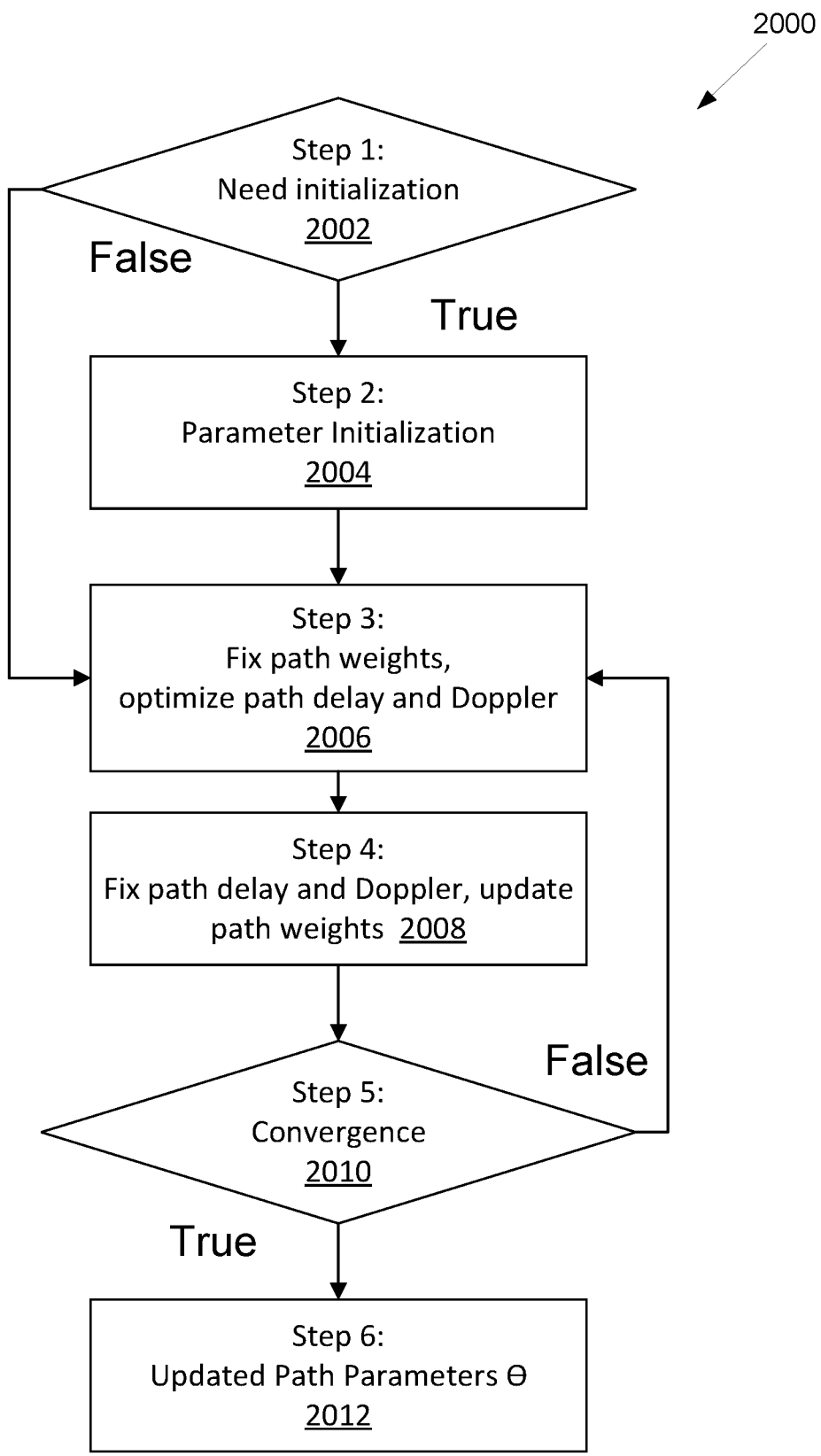
FIG. 20 illustrates an example parameter estimation algorithm according to embodiments of the present disclosure.

FIG. 20 illustrates an example parameter estimation algorithm 2000 according to embodiments of the present disclosure. The embodiment of the parameter estimation algorithm 2000 illustrated in FIG. 20 is for illustration only. FIG. 20 does not limit the scope of the present disclosure to any particular implementation.

In one embodiment of Step 1 (e.g., step 2002), the parameter estimation algorithm 2000 check if it is necessary to perform parameter initialization. In one method of the present disclosure, the parameter initialization is performed every time the SRS buffer is updated, which is every T/4 msec according to FIG. 12.

In another embodiment, the parameter initialization is performed only once at the beginning, and all subsequent processing relies on the final results from the previous one. In yet another embodiment, the parameter initialization is configured to perform every $T_s$ msec, which can be a multiple of SRS update periodicity T.

Figure 21:
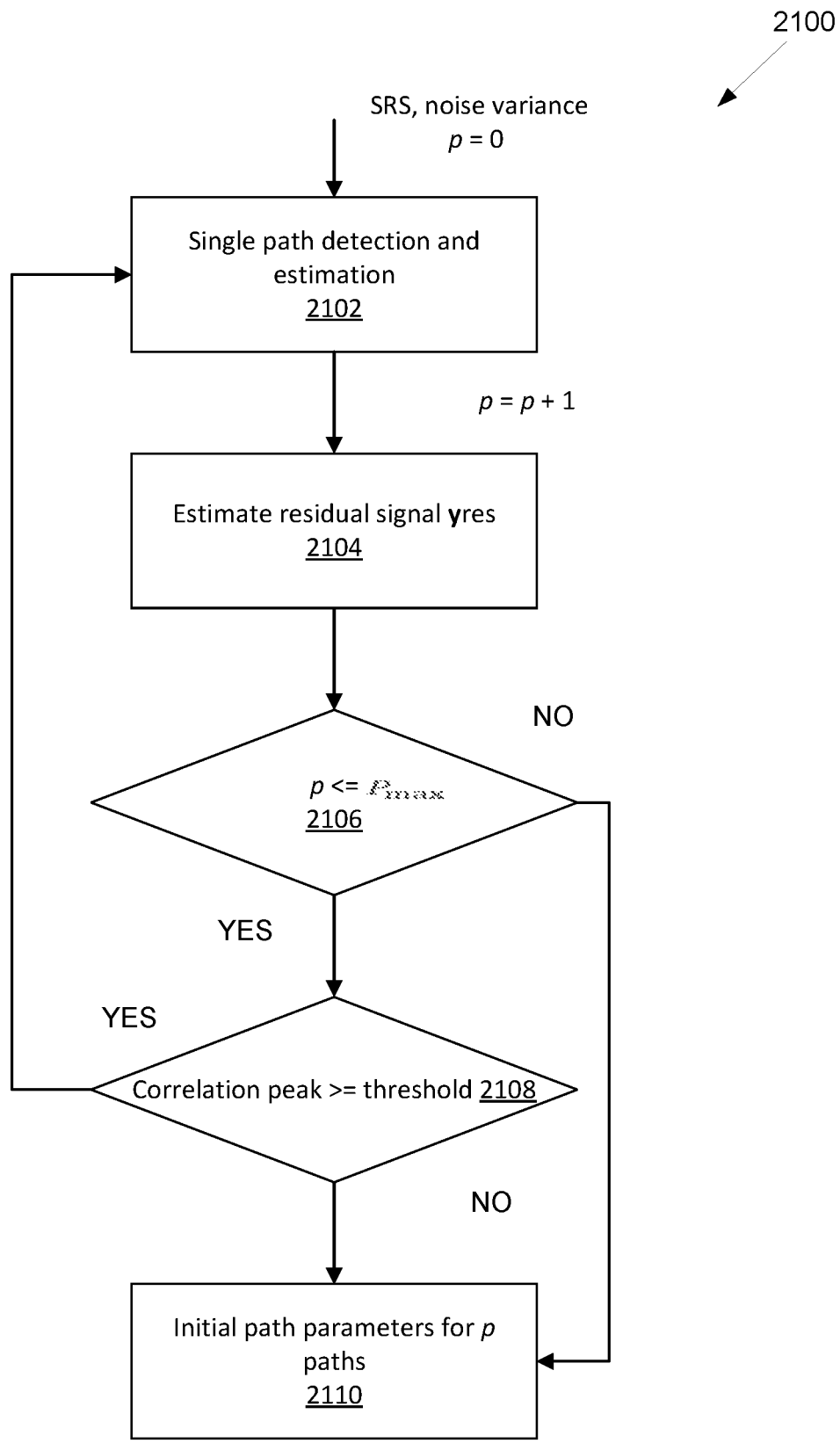
FIG. 21 illustrates an example iterative grid search algorithm according to embodiments of the present disclosure.

In one embodiment of Step 2 (e.g., step 2004), the parameter estimation algorithm 2000 perform the parameter initialization when the condition in step 1 is satisfied. FIG. 21 illustrates using an iterative grid search algorithm as one method of the present disclosure. It may be provided that attempt to detection and estimate one path at a time, and the index p keeps track of the number of initialized paths.

In one embodiment of the signal-path detection and estimation, it may start with the path searching on a coarse two-dimensional grid $S_L$, which is constructed based on two search vectors. One is for path delay $s_\tau$, and the other is for path Doppler $s_v$. $s_\tau = [0, \Delta\tau, \ldots, \tau_{max}]^T$ and $s_v = [-v_{max}, -v_{max} + \Delta v, \ldots, v_{max}]^T$.

In one embodiment, the element in $S_L$ is a tuple made up of elements from $s_\tau$ and $s_v$. For example, $[S_L]_{i,j} = (s_{\tau,i}, s_{v,j})$.

In one embodiment, $\tau_{max}$ equals the inverse of the frequency spacing of RBs, and $v_{max}$ equals 2/T, where T is the full-band SRS update periodicity illustrated in FIG. 12. In another embodiment, both $\tau_{max}$ and $v_{max}$ can be assigned with smaller numbers than the previous ones, which helps reduce the computational complexity by exploiting some prior knowledge about the maximal possible delay and Doppler of a dominant path.

The conventional signal correlation detection algorithm is provided to find the initial coarse path estimates $(\tau_{ini}, v_{ini})$, which is given by $$(\tau_{ini}, v_{ini}) = \underset{(\tau,v) \in S_L}{\arg\max} \sum_k \frac{|B(\tau, v)^H y_{res,k}|^2}{|B(\tau, v)|_2^2}.$$

The correlation calculated in the above optimization problem sums over all eNB antennas indexed by k. Based on these initial coarse numbers, a smaller 2D search grid $S_s$ centered around $(\tau_{ini}, v_{ini})$ with a finer resolution may be constructed. In one embodiment, the delay and Doppler search resolution are reduced to 1/10 of their previous values. The grid point on $S_s$ that leads to the maximal detection correlation is used to update $(\tau_{ini}, v_{ini})$. This process is repeated until either the grid resolution is too small. The path weights can be initialized with a least-square estimation.

The residual signal is calculated by subtracting reconstructed contributions of initialized p paths from the input SRS, which is given by $y_{res,k} = y_{srs,k} - \sum_{i=1}^{P} B(\tau_i, v_i) \gamma_{i,k}$.

From Step 3 to Step 5 (e.g., steps 2006-2018), a local optimization of path parameters is performed based on their initial values. In one method of the present disclosure, the path parameter is separated into two sets. The first set contains path delay and Doppler, and the other set contains path weights. An alternative optimization is performed for two sets of parameters until the convergence of all parameters is reached.

In on embodiment of Step 3 (E.g., 2006), path weights are fixed and the Levenberg-Marquardt (LM) algorithm to is used update path delay and Doppler, denoted as $\theta_\mu$. LM is an iterative optimization algorithm. The parameter update equation at n-th step is given by $\theta_\mu^{n+1} = \theta_\mu^n + [J(\theta_\mu^n) + \zeta I \odot J(\theta_\mu^n)]^{-1} q(y_{srs} | \theta_\mu^n)$ where $J(\theta_\mu^n)$ is the fisher information matric (FIM) and $q(y_{srs} | \theta_\mu^n)$ is the score function. $\zeta$ is the step size parameter in the LM algorithm. I represents an identity matrix. The operator $\odot$ is the Hadamard product of two matrices.

Score-function is the gradient of the log-likelihood function, which is a centerpiece in the gradient-based optimization algorithm. The log-likelihood function is the objective function in the maximum likelihood estimation, which can be expressed by $L(y_{srs}|\theta)=\ln(P_r((y_{srs}|\theta))$ where $p((y_{srs}|\theta))$ is the conditional probability that can be expressed based on the complex Gaussian distribution. The score function is then expressed by $$q(y_{srs}|\theta) = \frac{\partial \ln(P_r((y_{srs}|\theta))}{\partial \theta}.$$

In statistics, the Fisher information is a way to measure the amount of information that the observable data $y_{srs}$ on the parameters $\theta$. Fisher information matrix (FIM) is the negative expected value of Hessian matrix of the log-likelihood function, so it depends on the second-order derivative of the log-likelihood function. The i-th row and j-th column of FIM is defined as $$[J]_{ij} = -E\left[\frac{\partial^2}{\partial \theta_i \partial \theta_j}L(y_{srs}|\theta)\right].$$

In one embodiment of Step 4 (e.g., step 2008), path delay and Doppler are fixed, and path weights are updated. B may be used to represent $B(\tau, v)$ for brevity. In one embodiment, the least-square method may be used to update path weights. $\gamma_{LS}=(B^H B)^{-1} B^H y_{srs}$.

In another embodiment, the minimum mean square error (MMSE) method is used to update path weights.

$$\gamma_{MMSE} = \left(B^H B + \frac{N_0}{\sigma_s^2}I\right)^{-1} B^H y_{srs}.$$

For the least square method, the calculation considering SRS across all eNB antennas is provided in one embodiment; in another embodiment, least-square estimation is performed separately on each eNB antenna.

In one embodiment of Step 5 (e.g., 2010), the convergence of parameters is checked from both step 3 and step 4. If the convergence is met, it goes to step 6 (e.g., 2012) and provides the final path parameter. If not, it goes to step 3 and continues the optimization.

In another embodiment, two types of extrapolators to predict SRS may be combined, which allows some tradeoff between complexity and prediction performance. In one example, 3D-ML is combined with a linear extrapolator based on 1D-Wiener filter and call the 3D-ML the hybrid approach. The motivation of this hybrid approach stems from a more generic modeling of wireless propagation channel as a sum of deterministic and stochastic signals.

The deterministic signals include the direct line-of-sight, strong reflection and diffraction, which can be captured with the model adopted in 3D-ML. Meanwhile there are also weaker and yet a large number of components, which include weak reflection and surface diffusion. Each of these weak components is difficult to quantify precisely, but their total contribution may have some correlation property over time or frequency, which a 1D-Wiener filter can exploit to improve the accuracy of predicted CSI.

FIG. 21 illustrates an example iterative grid search algorithm 2100 according to embodiments of the present disclosure. The embodiment of the iterative grid search algorithm 2100 illustrated in FIG. 21 is for illustration only. FIG. 21 does not limit the scope of the present disclosure to any particular implementation.

As illustrated in FIG. 21, the iterative grid search algorithm 2100, in step 2102, performs single path detection and estimation. In step 2104, the iterative grid search algorithm 2100 estimates residual signal yres. In step 2106, the iterative grid search algorithm 2100 determines whether Pmax is greater than or equal to p. If the Pmax is greater than or equal to p, the iterative grid search algorithm 2100 goes to step 2108. In step 2108, the iterative grid search algorithm 2100 determines whether correlation peak is greater than or equal to a threshold, and if not, the iterative grid search algorithm 2100 goes to step 2110. In step 2110, the iterative grid search algorithm 2100 determines initial path parameters for p paths. In step 2106, Pmax is less than p, the iterative grid search algorithm 2100 goes to step 2110. In step 2108, correlation peak is greater than or equal to the threshold, the iterative grid search algorithm 2100 goes to step 2102.

Figure 22:
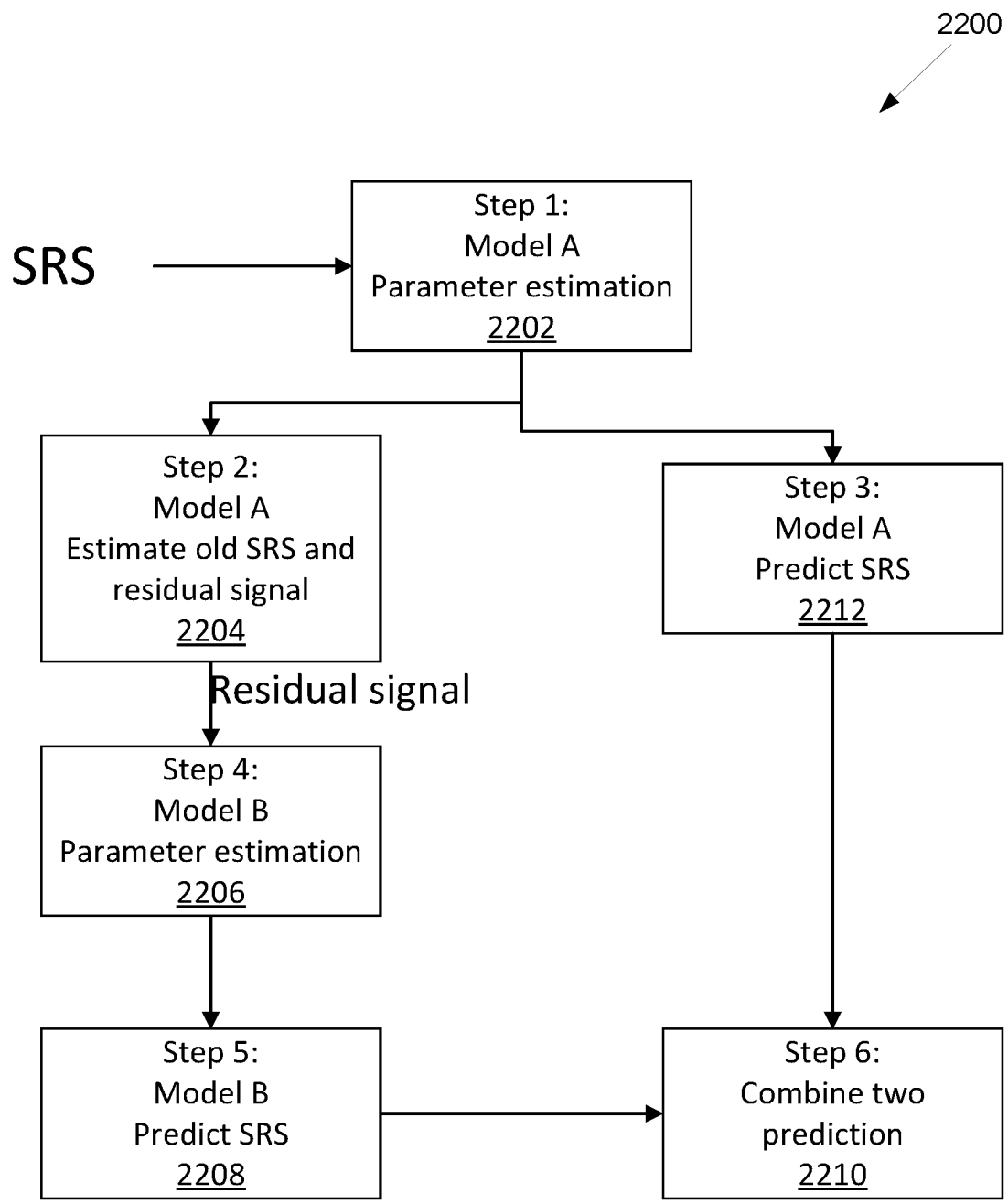
FIG. 22 illustrates an example hybrid approach to perform SRS prediction with the aid of two channel models according to embodiments of the present disclosure.

FIG. 22 illustrates an example hybrid approach to perform SRS prediction with the aid of two channel models 2200 according to embodiments of the present disclosure. The embodiment of the hybrid approach to perform SRS prediction with the aid of two channel models 2200 illustrated in FIG. 22 is for illustration only. FIG. 22 does not limit the scope of the present disclosure to any particular implementation.

FIG. 22 illustrates the hybrid approach to perform SRS prediction with the aid of two channel models, i.e., model A and model B. In one embodiment, model A uses the sum of P sinusoids over time and frequency. The parameter estimation function for model A may use the 3D-ML algorithm in FIG. 20. The model B uses a stochastic channel model and an optimal linear extrapolator based on 1D-Wiener filter.

In one embodiment of Step 1 (e.g., step 2202), the input to the parameter estimation function of model A is the SRS channel estimate $y_{srs}$. If model A uses the sum-of-sinusoid multipath model $s(\theta)$, the algorithm highlighted in FIG. 20 may be used to estimate parameter $\theta$ for model A.

In one embodiment of Step 2 (e.g., 2204), path parameters $\theta$ is used from model A to reconstruct SRS in the buffer, and calculate the residual signal, which is the difference between the input SRS and estimated SRS based on model A. $y_{res}=y_{srs}-s(\theta)$.

In one embodiment of Step 3 (e.g., 2212), path parameters $\theta$ is used from model A to predict SRS on time and frequency resource blocks where UEs can potentially be scheduled.

In one embodiment of Step 4 (e.g., 2206), the input to the parameter estimation function of model B is the residual signal from step 2. The method to perform the parameter estimation for model B can follow the autocorrelation estimation illustrated in FIG. 16.

In one embodiment of Step 5 (e.g., 2208), using both the residual signal from step 2 and estimated autocorrelation function from model B, predicted SRS is generated on time and frequency resource blocks where UEs can potentially be scheduled.

In one embodiment of Step 6 (e.g., 2210), the final output is the sum of predicted channel responses from step 3 and step 5.

In one embodiment, a small parameter P is used to reduce the complexity of parameter estimation in model A, and rely on the functionality of model B to recover the loss of prediction performance due to a simpler realization of model A. The complexity of the estimation method outlined in FIG.

20 is reduced with a smaller P. Since the parameter estimation and SRS prediction based on model B can be relatively simple, this hybrid approach allows a tradeoff between complexity and prediction performance.

The present disclosure provides embodiments to "predict" CSI for those time-frequency resources for which no SRS channel estimates are available. For the prediction of the CSI, it may be provided that the BS uses the previously collected SRS channel estimates, based on a prediction model. The prediction model could be parameterized; and the channel prediction parameters are updated when the fresh SRS arrives.

The first novelty is to describe an EKF-based parametric channel prediction scheme. Channel response derived from uplink SRS measurements follows a multipath channel model, whose parameters are estimated and filtered based on extended Kalman filter (EKF), and the parameters are further used to predict channel response in the future. The second novelty includes candidate EKF state vectors, which are derived from the multipath-based channel model.

To the best of the present disclosure, there has been no prior art in the topic of using EKF to perform channel prediction based on a parametric multipath-based model. The key benefits of the present disclosure includes: (1) the ability to utilize frequency-hopping SRS to predict future channel response, (2) low computational complexity with Kalman filtering to track and estimate channel parameters, (3) zero reliance on the knowledge of channel statistics (e.g., channel delay and Doppler spread, channel time and frequency autocorrelation function, etc.), and (4) robustness against the low uplink SNR scenario.

Figure 23:
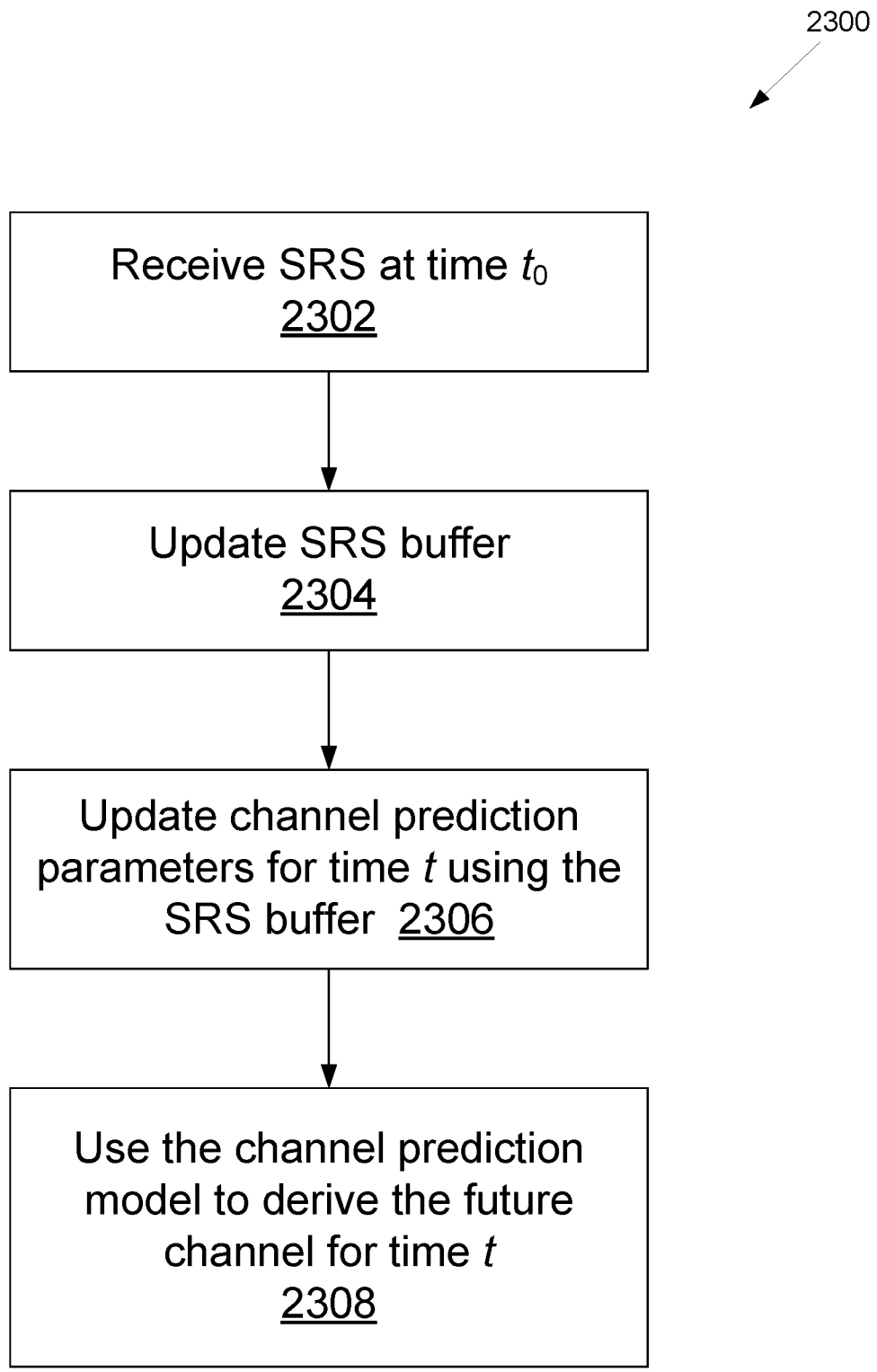
FIG. 23 illustrates an example structure of channel prediction according to embodiments of the present disclosure.

FIG. 23 illustrates an example structure of channel prediction 2300 according to embodiments of the present disclosure. The embodiment of the channel prediction 2300 illustrated in FIG. 23 is for illustration only. FIG. 23 does not limit the scope of the present disclosure to any particular implementation.

The present disclosure provides a new EKF-based channel prediction method for massive MIMO (mMIMO) systems. The method consists of a buffer that stores past uplink SRS measurements, a parameter estimation module and a channel prediction module. FIG. 23 illustrates the structure of the channel prediction method based on the present disclosure. The accurately predicted channel can be used by other functional blocks in BS. For example, it helps BS scheduler optimize resource allocation, and increase the accuracy of downlink (DL) precoder and performance of DL MU-MIMO transmission.

As illustrated in FIG. 23, for channel prediction, SRS is received at time to in step 2302. Subsequently, in step 2304, an SRS buffer is updated. Next, in step 2306, channel prediction parameters are updated for time t using the SRS buffer. Finally, in step 2308, the channel prediction model is used to derive the future channel for time t.

Figure 24:
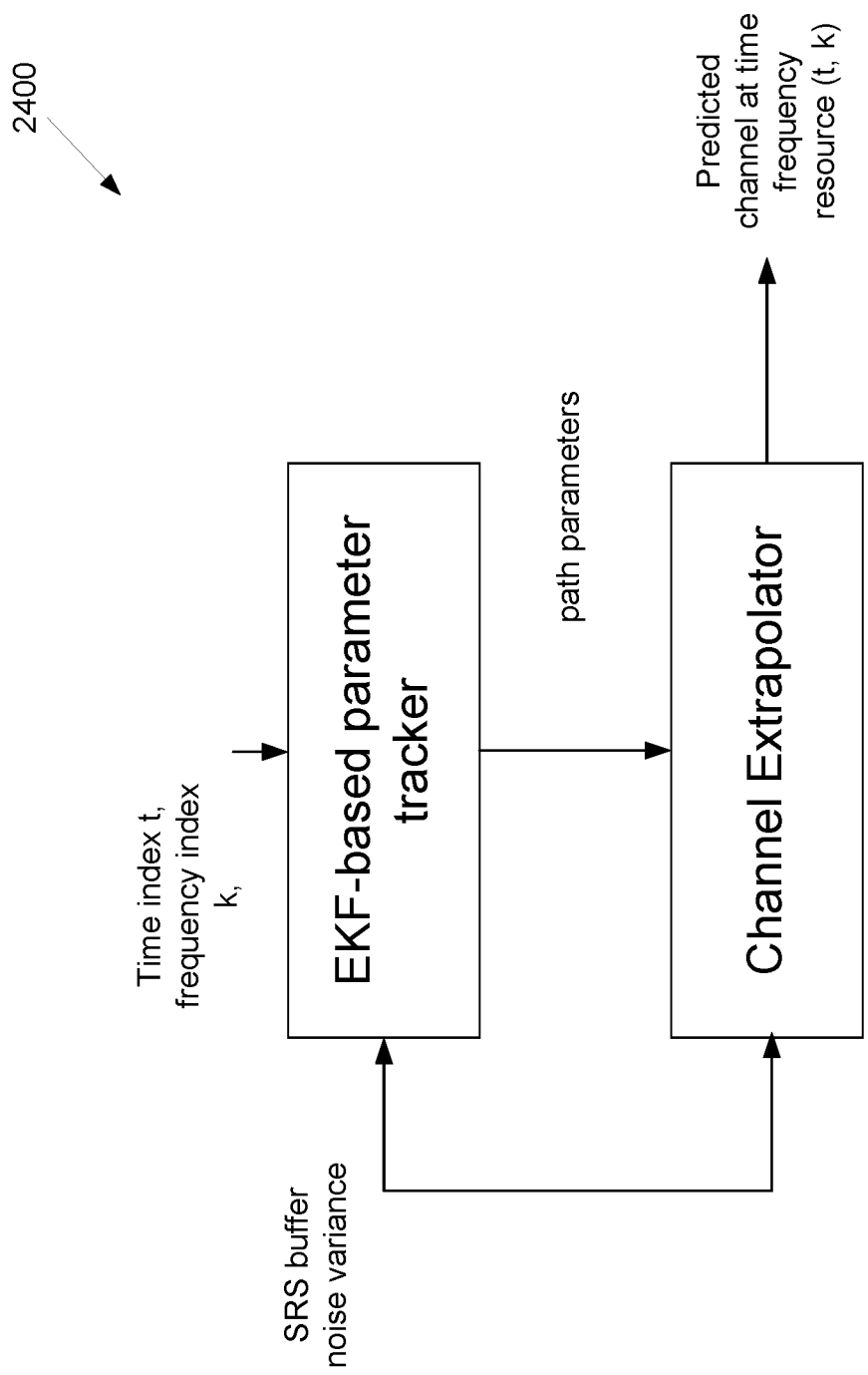
FIG. 24 illustrates an example implementing EKF-based parameter tracker according to embodiments of the present disclosure.

FIG. 24 illustrates an example implementing EKF-based parameter tracker 2400 according to embodiments of the present disclosure. The embodiment of the implementing EKF-based parameter tracker 2400 illustrated in FIG. 24 is for illustration only. FIG. 24 does not limit the scope of the present disclosure to any particular implementation.

The present disclosure provides details of the last two functional blocks in FIG. 23. FIG. 24 illustrates an example of implementing EKF-based parameter tracker that outputs updated path parameters given SRS history and other parameters.

Both EKF-based parameter tracker and channel extrapolator rely on the following multipath channel model, where the time-frequency channel response $\hat{h}(t, f_k)$ is modeled as a sum of contributions from several multipath components (MPC). The model assumes the channel is constructed on a sum of basis waveforms. One example in the present disclosure is to use P sinusoidal waveforms indexed by $p=1, 2, \ldots, P$. Waveform p is parameterized by signal delays $\tau_p$ and signal Doppler shifts $v_p$, which spans both the time and frequency domain. Then, the channel at time t and frequency $f_k$ is a linear combination of the P basis waveforms: $\hat{h}(t, f_k) = \sum_{p=1}^{P} \gamma_p e^{-j2\pi(f_k \tau_p - t v_p)}$.

The present disclosures provide a vectorized signal model for SRS measurement. If the vectorization of $\hat{h}(t, f_k)$ performs first along the frequency domain and secondly along the time domain, the following function is given by $s(\tau, v, \gamma) = \text{vec}\{\hat{h}(t, f_k)\} = B(\tau, v) \cdot \gamma = B_2(\tau, v) \diamond B_1(\tau) \cdot \gamma$ where parameter vectors $\tau, v \in R^P$, and path weights $\gamma \in C^P$. Also, operator $\diamond$ represents Khatri-Rao product, which is a column-wise Kronecker product.

An example of the Khatri-Rao product between two 2×2 matrices is given by A $\diamond$ $$B = \begin{bmatrix} a_{11} & a_{12} \\ a_{21} & a_{22} \end{bmatrix} \diamond \begin{bmatrix} b_{11} & b_{12} \\ b_{21} & b_{22} \end{bmatrix} = \begin{bmatrix} a_{11}b_{11} & a_{12}b_{12} \\ a_{11}b_{21} & a_{12}b_{22} \\ a_{21}b_{11} & a_{22}b_{12} \\ a_{21}b_{21} & a_{22}b_{22} \end{bmatrix}$$

where $B_1(\tau)$ is a matrix-valued function, $R^P \rightarrow C^{M_f \times P}$, where $M_f$ is the number of tones (subcarriers) in a subband.

It represents the intra-subband SRS frequency response due to path delay, and p-th column can be expressed by $[B_1(\tau)]_p = e^{-j2\pi x_1 \delta_f \tau_p}$ where $$x_1 = \left[-\left\lfloor \frac{M_f}{2} \right\rfloor, -\left\lfloor \frac{M_f}{2} \right\rfloor + 1, \ldots, \left(\left\lceil \frac{M_f}{2} \right\rceil - 1\right)\right]^T \cdot \delta_f$$

denotes the frequency spacing of resource blocks (RB).

Similarly, $B_2(\tau, v)$ is also a matrix-valued function. In one embodiment where SRS is updated on a fraction of the total bandwidth every $\Delta t$ seconds, $B_2(\ )$ represents the inter-subband SRS response over time, which depends on both delay $\tau$ and Doppler v. The input and output mapping of $B_2(\tau, v)$ is $(R^P, R^P) \rightarrow C^{N_{srs} \times P}$. $N_{srs}$ is the number of SRS subbands to be processed in the buffer.

The p-th column can be expressed by $[B_2(\tau, v)]_p = e^{-j2\pi(m\Delta f \tau_p - n \Delta t v_p)}$ where m and n are frequency and time index sequences of subband SRS to be processed in the buffer.

In another embodiment, the vector signal model for SRS is extended to consider multiple BS antennas. It may be assumed that path delays and Dopplers are common across $N_{ant}$ antennas. In such case, the following equation is given by: $s(\tau, v, \Gamma) = \Gamma \diamond B_2(\tau, v) \diamond B_1(\tau) \cdot 1$ where $\Gamma$ is a path weight matrix with dimension $N_{ant} \times P$, and each row of $\Gamma$ contains path weights for one antenna. 1 stands for an all-one column vector with dimension P×1.

In one embodiment, it may be provided that SRS is corrupted with additive white Gaussian noise, the noisy SRS is given by $y_{srs} = s(\tau, v, \Gamma) + n_0$ where $n_0$ is the noise vector and follows a zero-mean complex Gaussian distribution with a covariance matrix $\tau_n^2 I$.

Given estimated parameters and time-frequency index of prediction channel RBs, the channel extrapolator in FIG. 2 is implemented by evaluating $s(\tau, v, \Gamma) = \Gamma \diamond B_2(\tau, v) \diamond B_1(\tau) \cdot 1$.

Figure 25:
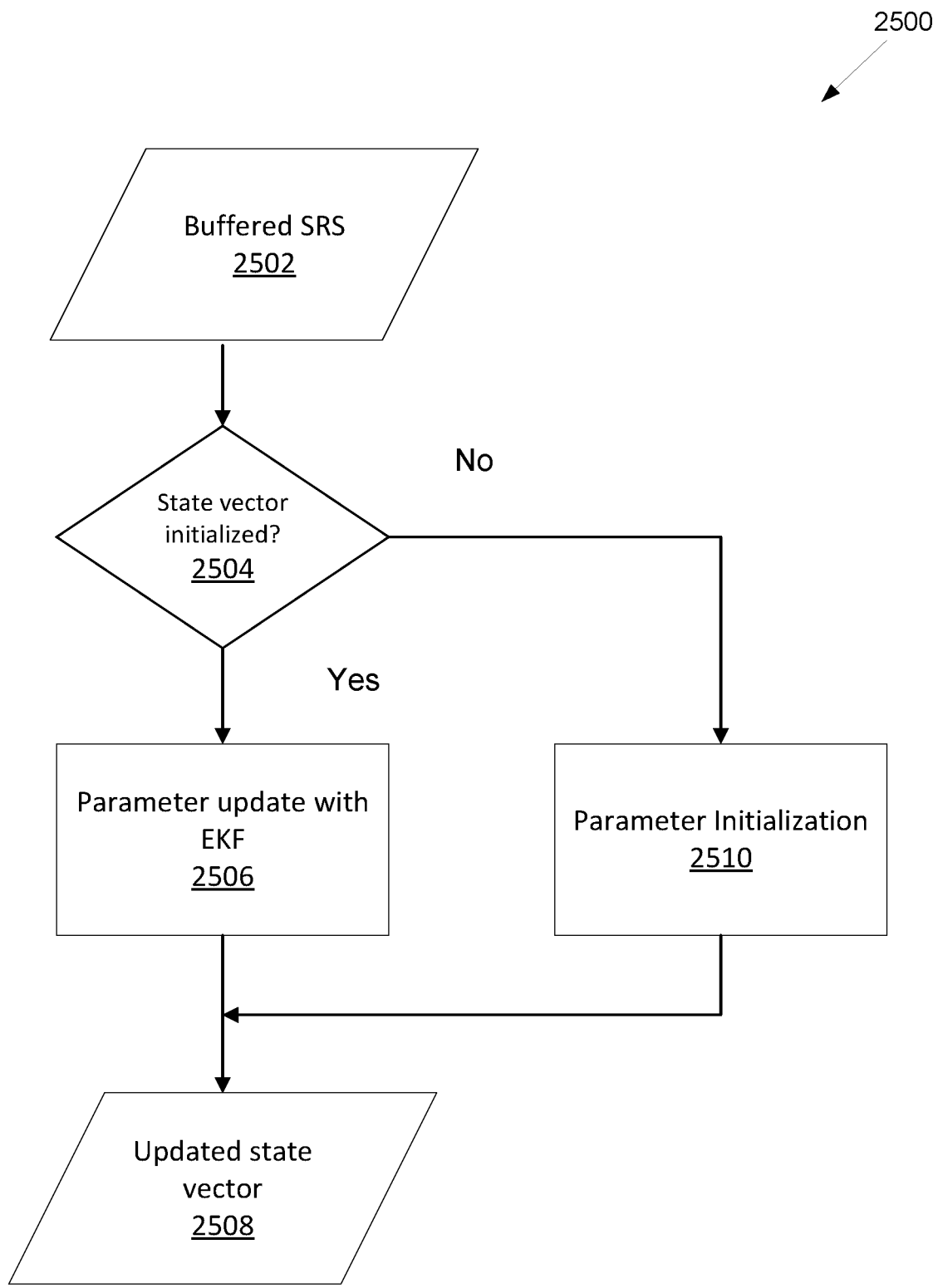
FIG. 25 illustrates an example implementing EKF-based parameter tracker according to embodiments of the present disclosure.

FIG. 25 illustrates an example implementing EKF-based parameter tracker 2500 according to embodiments of the present disclosure. The embodiment of the implementing EKF-based parameter tracker 2500 illustrated in FIG. 25 is for illustration only. FIG. 25 does not limit the scope of the present disclosure to any particular implementation.

In one embodiment, the process related with state initialization is implemented based on a maximum-likelihood estimator (MLE), which aims to find path parameters $\theta_{ini}$ that maximize the likelihood probability.

As illustrated in FIG. 25, the EKF-based parameter tracker 2500, in step 2502, buffers SRS. Subsequently, in step 2504, the EKF-based parameter tracker 2500 determines whether state vector is initialized. In step 2504, if the state vector is initialized, the EKF-based parameter tracker 2500 goes to step 2506. In step 2504, if the state vector is not initialized, the EKF-based parameter tracker 2500 goes to step 2510. Subsequently, in step 2506, the EKF-based parameter tracker 2500 updates parameter with EKF. Next, in step 2508, the EKF-based parameter tracker 2500 obtains the updated state vector. Next, in step 2510, the EKF-based parameter tracker 2500 performs parameter initialization and obtains the updated state vector in step 2508.

$$\theta_{ini} = [\tau_{ini}^T, v_{ini}^T, \gamma_{ini}^T]^T = \underset{\theta}{\arg\max}\, P_r(y_{srs}(t_0) \mid \theta)$$

where $y_{srs}(t_0)$ represents the vectorized SRS measurement stored in the buffer at time $t_0$. The MLE is implemented by an iterative parameter grid search method outlined, which jointly processes SRS across time, frequency and antenna.

In one embodiment, constructing the state vector and implementing EKF prediction and updating equations are provided given as follows. At n-th time instant, the state vector $\theta_n$ consists of path delay and Doppler from P paths. $\theta_n = [\tau_n^T, v_n^T]^T$. It is a 2P×1 column vector. To differentiate this EKF version from those in alternative solutions, it may be referred to this version as complexity-reduced EKF with reduced state vector (CR-EKF-RSV).

Figure 26:
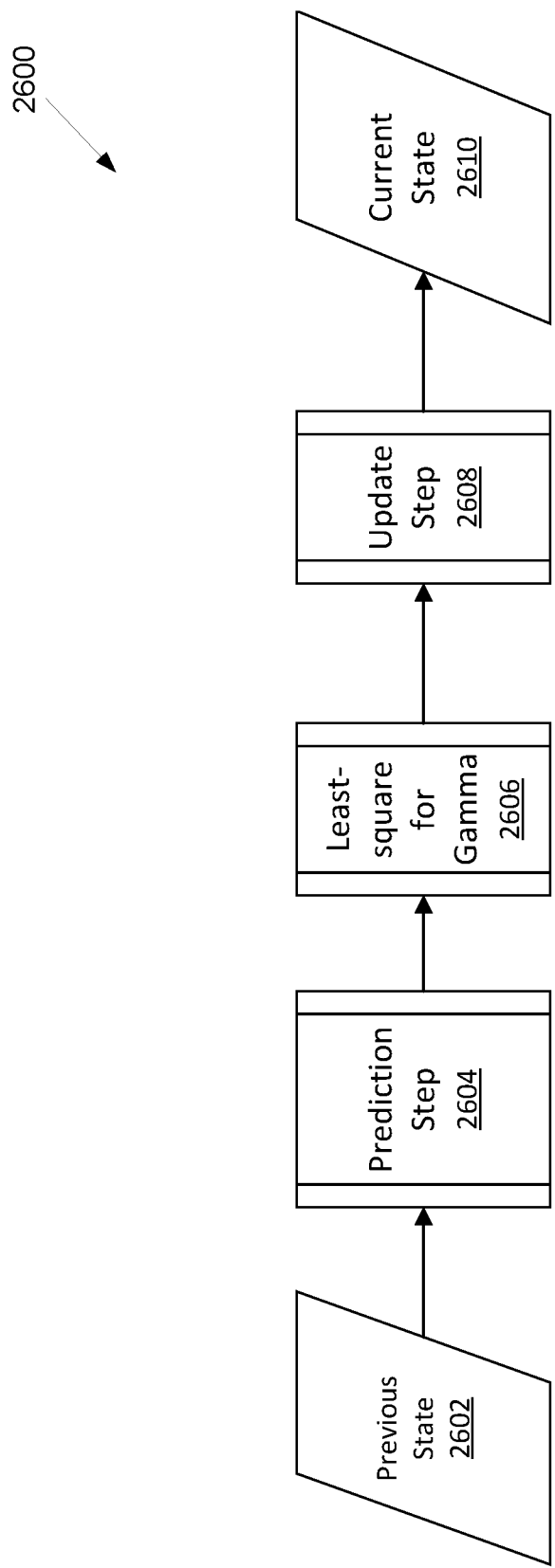
FIG. 26 illustrates an example functional block of parameter update with EKF according to embodiments of the present disclosure.

FIG. 26 illustrates an example functional block of parameter update with EKF 2600 according to embodiments of the present disclosure. The embodiment of the functional block of parameter update with EKF 2600 illustrated in FIG. 26 is for illustration only. FIG. 26 does not limit the scope of the present disclosure to any particular implementation.

As illustrated in FIG. 26, the functional block of parameter update with EKF 2600 comprises a previous state function block 2602, a prediction step function block 2604, a least-square for Gamma function block 2606, an update step function block 2608, and a current state function block 2610.

FIG. 26 outlines the flowchart to implement the functional block of parameter update with EKF. The EKF main equations include prediction and update steps. The prediction steps take $\theta_{n-1}$ and filtering error matrix $P_{n-1}$ from the previous state. $\theta_{n|n-1} = \Phi\theta_{n-1}$ and $P_{n|n-1} = \Phi P_{n-1}\Phi^T + Q$. Based on $\theta_{n|n-1}$, $B(\tau, v)$ may be conducted and the path weights is updated with Least-square (LS) calculation, which is given by $\gamma_{LS} = (B^H B)^{-1} B^H y_{srs}$.

The update steps are $P_n = (P_{n|n-1}^{-1} + J(\theta_{n|n-1}, \sigma_n))^{-1}$, $\Delta\theta_n = P_n q(y_{srs,n}; \theta_{n|n-1}, \sigma_n)$, and $\theta_n = \theta_{n|n-1} + \Delta\theta_n$ where $\Phi$ is the state transition matrix and Q is the state noise covariance matrix. $q(y_n|\theta_n)$ is the score-function, and it can be computed by $$q(y;\theta,\sigma_n) = \frac{2}{\sigma_n^2}\mathrm{Re}\{D^H y\}.\ J(\theta,\sigma_n)$$

is the Fisher information matrix, which can be computed by $$J(\theta,\sigma_n) = \frac{2}{\sigma_n^2}\mathrm{Re}\{D^H D\}.\ D$$

denotes the Jacobian matrix and is computed as $$\frac{\partial s}{\partial \theta^T}.$$

The output of the update step is $\theta_n$ and $P_n$ as the current state.

The motivation is that evolution of path delay and Doppler over time is modeled by the state noise, which reduces the size of state vector and thus overall implementation complexity of EKF. $\tau_n = \tau_{n-1} + w_{\tau_n}$, $v_n = v_{n-1} + w_{v_n}$ where $w_{\tau_n}$ and $w_{v_n}$ are state perturbation noise added to path delay and Doppler respectively. In this embodiment, it may be assumed the noise variance is the same across P paths, hence $q = [q_\tau; q_v]$ is a 2×1 vector that contains state perturbation variance for delay and Doppler.

As a result, the state transition matrix and state covariance matrix in this embodiment are given as $\Phi = I_{2P}$, and $Q = \mathrm{diag}(q\Delta t) \otimes I_P$ where $I_P$ is P×P identify matrix. The function diag(x) returns a diagonal matrix with i-th diagonal element given by $x_i$. The operator $\otimes$ represents the Kronecker product between two matrices.

Alternatives ($2^{nd}/3^{rd}$ embodiments) (the alternatives may focus on variations or additional features (components/steps) of the "best and broadest solution" described in the previous page. For each alternative embodiment, two figures may be provided: one for describing the components of the present disclosure, and the other for describing the steps performed by the present disclosure. Including the alternatives can increase the chances of receiving an A1 grade but the most weight is given to the description of the essential components/steps).

In another embodiment, SRS is updated for the whole bandwidth every $\Delta t$ seconds, the main difference is related with the multipath channel model, where the matrix-valued function $B_2()$ represents the phase rotation of SRS over time and is purely a function of Doppler v. The input and output mapping of $B_2(v)$ is $(R^P) \to C^{N_{srs} \times P}$. The p-th column can be expressed by $[B_2(v)]_p = e^{j2\pi(n\Delta t v_p)}$ where n is the time index sequence of full-band SRS in the buffer. For example, if $N_{srs}$ full-band SRS is in the buffer, $n = [0, 1, 2, \ldots N_{srs} - 1]$.

In another embodiment of the present disclosure, the parameter initialization step in FIG. 25 goes through additional nonlinear optimization following the iterative grid-search method of the main solution. The workflow of this alternative method is given in FIG. 27. This alternative embodiment for state initialization has a higher computational complexity, while improving the accuracy of initial estimated state parameters. It may be referred as EKF RSV.

Figure 27:
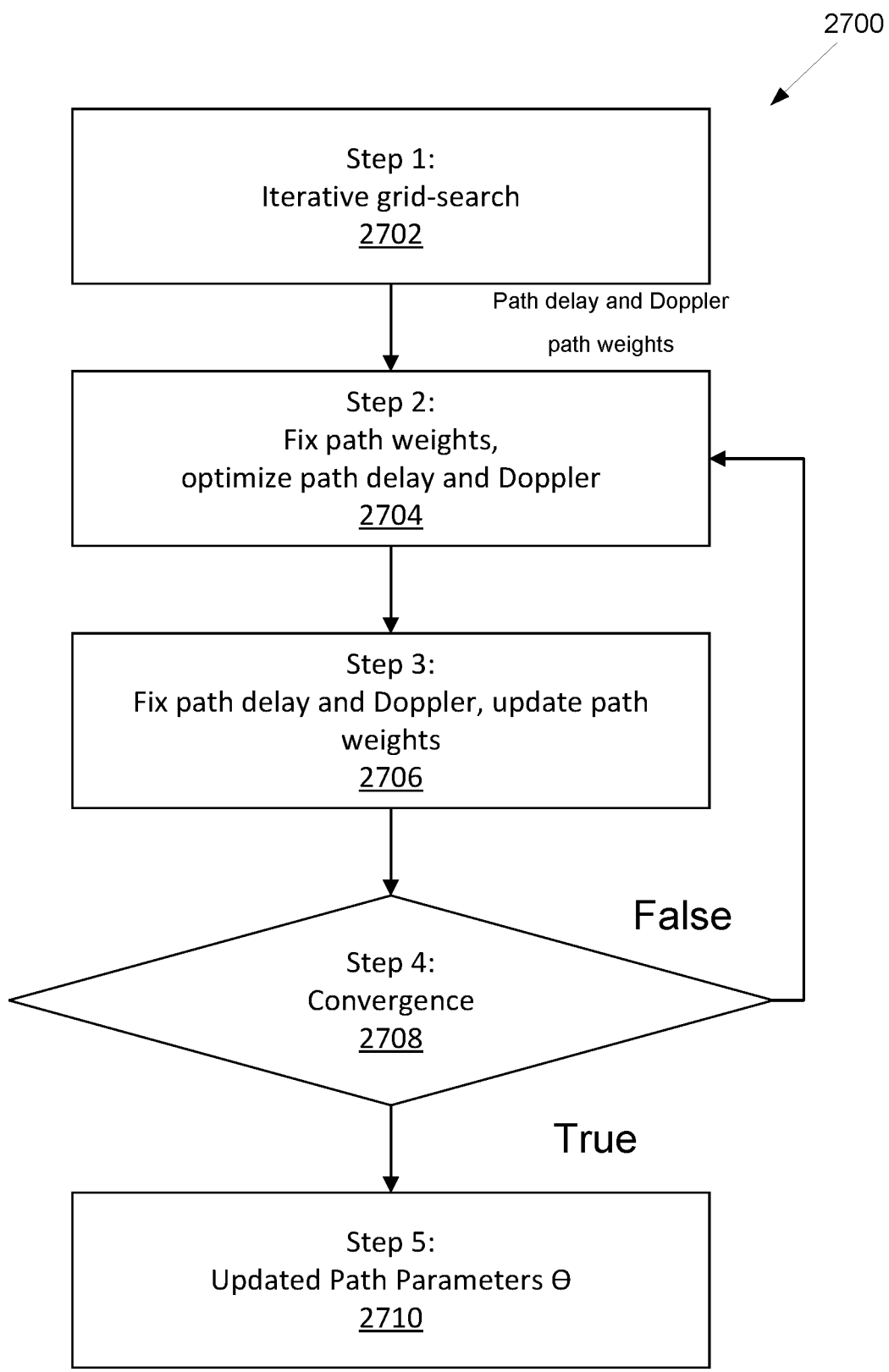
FIG. 27 illustrates another example grid search algorithm according to embodiments of the present disclosure.

FIG. 27 illustrates another example grid search algorithm 2700 according to embodiments of the present disclosure. The embodiment of the grid search algorithm 2700 illustrated in FIG. 78 is for illustration only. FIG. 27 does not limit the scope of the present disclosure to any particular implementation.

As illustrated in FIG. 27, the grid search algorithm 2700 of Step 1 (e.g., step 2702) performs iterative grid search. Next, the grid search algorithm 2700 of Step 2 (e.g., step 2704) fixes path weights and optimizes path delay and Doppler. Subsequently, the grid search algorithm 2700 of Step 3 (e.g., 2706) fixes path delay and Doppler and updates path weights. Subsequently, the grid search algorithm 2700 of Step 4 (e.g., 2708) checks convergence of parameters, if the convergence is met, the grid search algorithm 2700 goes to step 5 (e.g., 2710) and determines updated path parameters θ, if not, the grid search algorithm 2800 goes to step 2 (e.g., step 2704).

Figure 28:
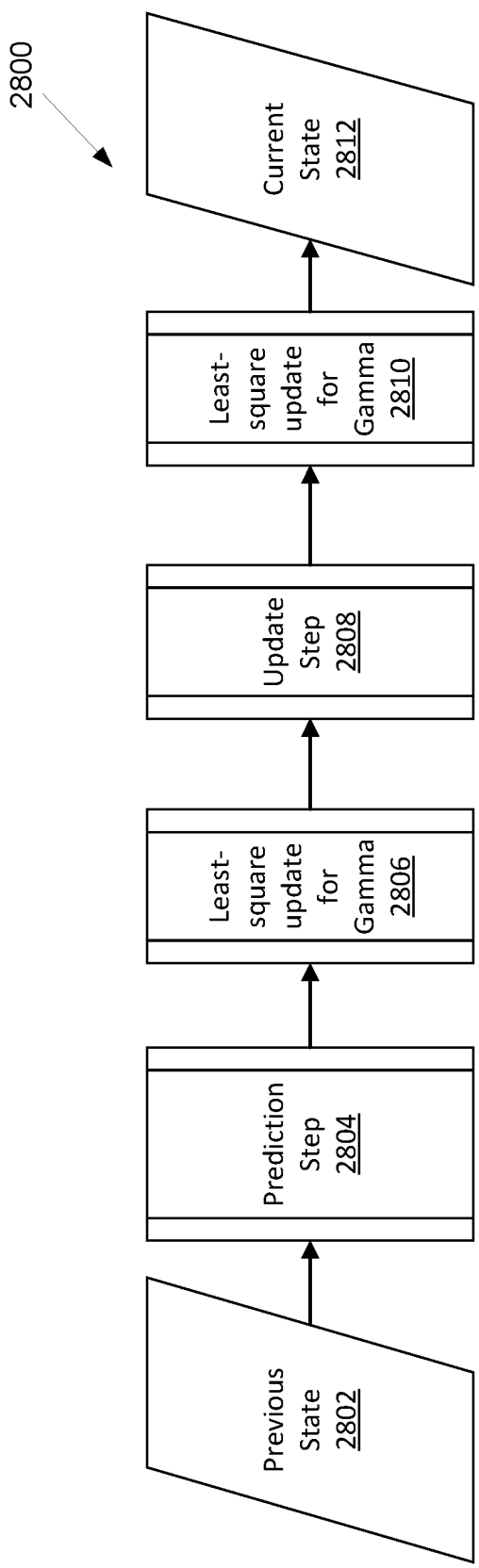
FIG. 28 illustrates an example two least squares updates for path weights according to embodiments of the present disclosure.

FIG. 28 illustrates an example two least squares updates for path weights 2800 according to embodiments of the present disclosure. The embodiment of the two least squares updates for path weights 2800 illustrated in FIG. 28 is for illustration only. FIG. 28 does not limit the scope of the present disclosure to any particular implementation.

As illustrated in FIG. 28, the functional block for the two least squares updates for path weights 2800 comprises a previous state function block 2802, a prediction step function block 2804, a least-square update for Gamma function block 2806, a update step function block 2808, a least-square update for Gamma function block 2810, and a current state function block 2812.

To demonstrate the performance of the new embodiment, time-varying channel is simulated by using 3GPP 3D channel model with 6 kmph user speed. The input to the prediction algorithm is past SRS sampled on a subband and every 10 milliseconds (msec). The method outputs future channel response $y_{pred}$ on the entire bandwidth and every millisecond, which is then compared with the ground truth $y_{true}$ generated by the simulator.

In particular, the normalized mean squared error (NMSE), i.e., the power ratio between prediction error ($y_{pred}-y_{true}$) and the true channel $y_{true}$ is evaluated. The NMSE is defined as $$NMSE = \frac{|y_{pred} - y_{true}|_2^2}{|y_{true}|_2^2}.$$

Figure 29:
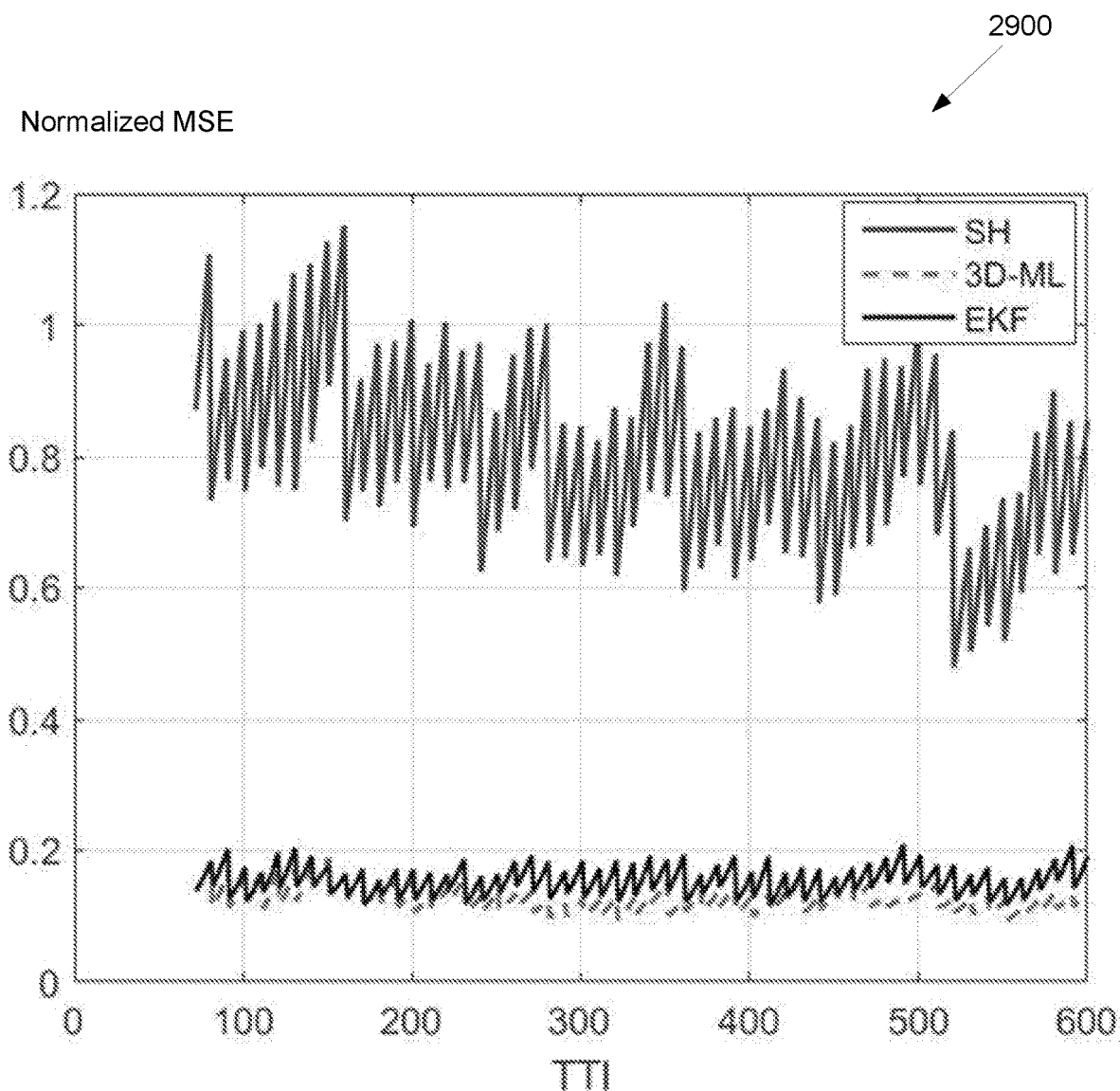
FIG. 29 illustrates an example of NMSE of predicted channel according to embodiments of the present disclosure.

FIG. 29 illustrates an example NMSE of predicted channel 2900 according to embodiments of the present disclosure. The embodiment of the NMSE of predicted channel 2900 illustrated in FIG. 29 is for illustration only. FIG. 29 does not limit the scope of the present disclosure to any particular implementation.

In FIG. 29, the squared root of prediction NMSE of CR-EKF-RSV is compared with conventional sample-hold method and computationally expensive maximum likelihood (ML) based method, which is labeled as 3D-ML. Both 3D-ML and EKF significantly outperform sample-hold. As illustrated in FIG. 29, comparison of NMSE of predicted channel between the provided EKF and benchmark SH method and 3D-ML is provided.

Besides the system-level simulations (SLS) with EKF is provide. The channel generation follows the ITU UMi model. A BS operates at a carrier frequency of 2.1 GHz in time-division duplex (TDD) mode, and the BS is equipped with 32 antennas. The performance robustness under different uplink SINR and user speed are tested.

TABLE 1 provides a summary of geometric mean throughputs (Tput) of various channel predictions. The ideal channel case means BS has a perfect knowledge on UE channel response on the whole band and every millisecond.

TABLE 1

Geometric Mean Throughput comparison between channel prediction methods under different uplink SINR and speed

| | | Speed | | | |
| --- | --- | --- | --- | --- | --- |
| | | 3 km/h | | 6 km/h | |
| | | SINR | | | |
| Method | | 0 dB | 20 dB | 0 dB | 20 dB |
| Sample-hold | Tput Gain | 100% | 100% | 100% | 100% |
| 3D-ML | | 157% | 114% | 197% | 147% |
| CR-EKF-RSV | | 151% | 117% | 194% | 153% |
| Ideal Channel | | 188% | 119% | 250% | 163% |

It may see that EKF achieves a significant throughput gain against the conventional sample-hold method and are comparable with 3D-ML, while EKF generally requires a much lower complexity than 3D-ML.

TABLE 2 provides a comparison about the number of multiplier-accumulator (MAC) operations and throughput gain between EKF RSV, CR EKF RSV and 3D-ML for 6 kmph UE speed and 20 dB uplink SINR. As indicated in FIG. 25, the MAC counts are calculated separately for state initialization, i.e., cold start in TABLE 2, and state update, i.e., Normal operation in TABLE 2. Both EKF RSV and CR EKF RSV have much smaller MAC counts than 3D-ML in the normal operation. Among two EKF embodiments, CR EKF RSV has a smaller MAC count and lower complexity.

TABLE 2

Comparison about MAC operations and throughput gain between EKF RSV, CR EKF RSV and 3D-ML

| | | MAC Operations | | |
| --- | --- | --- | --- | --- |
| Paths | | Cold Start | Normal Operation | Tput Gain |
| 3 | 3D-ML | 6,208,507 | 2,762,081 | 127% |
| | EKF RSV | 6,254,775 | 71,946 | 125% |
| | CR EKF RSV | 3,492,694 | 71,946 | 125% |
| 6 | 3D-ML | 11,898,208 | 5,982,200 | 144% |
| | EKF RSV | 12,001,830 | 166,278 | 147% |
| | CR EKF RSV | 6,019,630 | 166,278 | 147% |
| 10 | 3D-ML | 20,301,012 | 11,092,228 | 147% |
| | EKF RSV | 20,502,834 | 338,646 | 155% |
| | CR EKF RSV | 9,410,606 | 338,646 | 153% |

Figure 30:
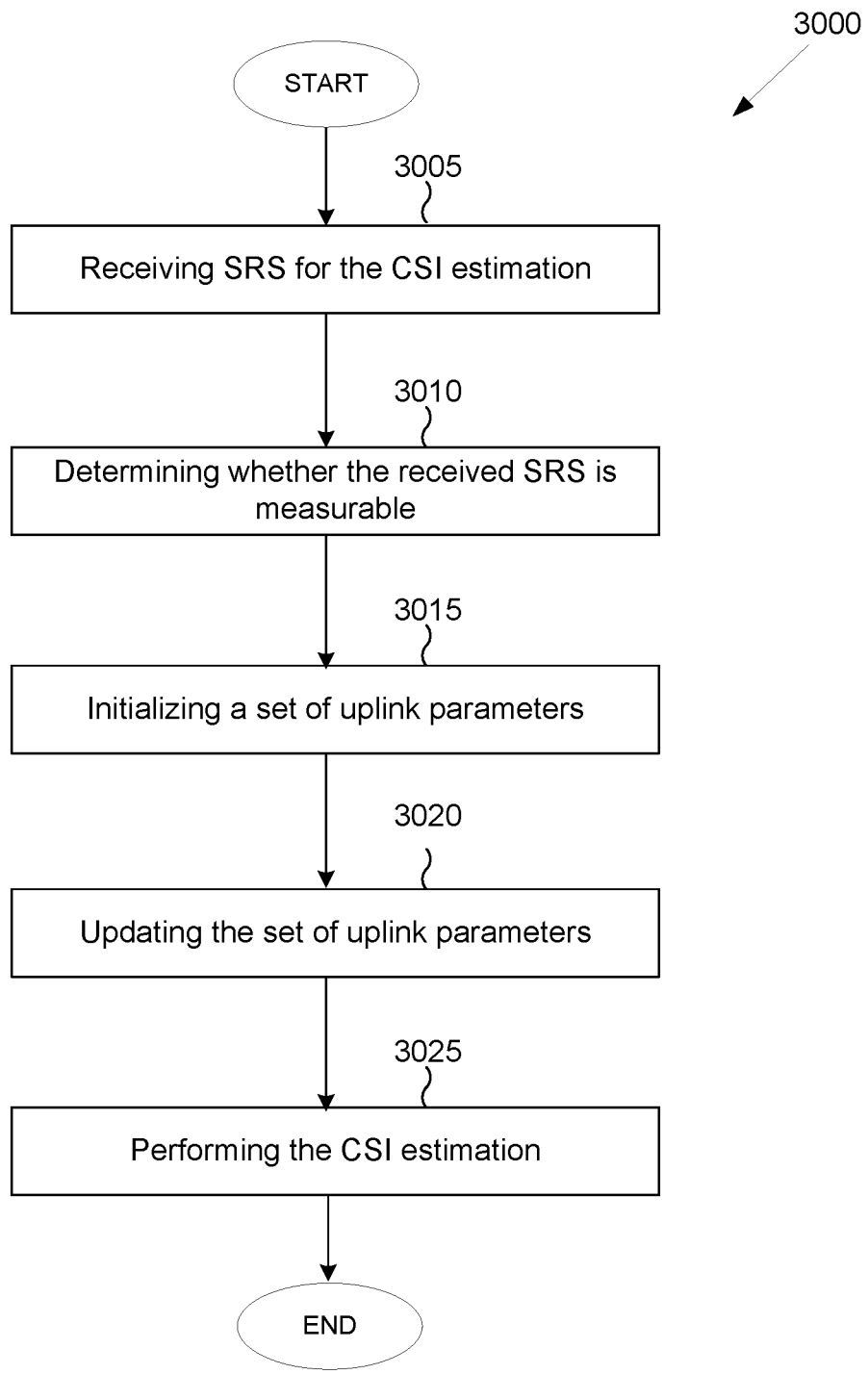
FIG. 30 illustrated a flow chart of a method for CSI estimation and prediction according to embodiments of the present disclosure.

FIG. 30 illustrated a flow chart of a method 3000 for CSI estimation and prediction according to embodiments of the present disclosure, as may be performed by a base station (BS) (e.g., 101-103 as illustrated in FIG. 1). The embodiment of the method 3000 illustrated in FIG. 30 is for illustration only. FIG. 31 does not limit the scope of the present disclosure to any particular implementation.

As illustrated in FIG. 30, the method 3000 begins at step 3005. In step 3005, the BS receives, from a user equipment (UE), a sounding reference signal (SRS) for the CSI estimation.

Subsequently, in step 3010, the BS determines whether the received SRS is measurable for the CSI estimation.

Subsequently, in step 3015, the BS initializes a set of parameters based on a result of the determination.

Next, in step 3020, the BS updates, based on the set of parameters, a set of channel prediction parameters stored in an SRS buffer.

Finally, in step 3025, the BS performs, using a channel prediction model, the CSI estimation based on the updated set of channel prediction parameters.

In some embodiments, the BS inputs predicted CSI to massive multi-input multi-output unit (MMU) scheduler.

In some embodiments, the BS inputs the predicted CSI to a downlink multi-user multi-input multi-output (MU-MIMO) precoder.

In some embodiments, the BS obtains an SRS buffer noise variance that is determined based on the updated uplink parameters.

In one embodiment, the set of uplink parameters comprises path delay, Doppler and path weights from a number of paths between the UE and the BS.

In some embodiments, the BS update path delay and Doppler with EKF using a vectorized signal model of SRS estimates. In such embodiments, the vectorized signal model includes a time index sequence and a frequency index sequence of subband SRS that is processed in the SRS buffer.

In such embodiment, the state vector comprises a path delay and Doppler from a number of paths between the UE and the BS.

In some embodiments, the BS initializes the set of uplink parameters using a grid search algorithm in accordance with an iterative sequential interference cancellation (SIC)-type scheme.

In some embodiments, the BS updates the set of uplink parameters using a linear or nonlinear calculation of path weights.

In some embodiments, the BS uses least square method to update path weights.

In some embodiments, the set of uplink parameters comprises channel autocorrelation function, and the processor uses a Wienerfilter to perform downlink CSI estimation Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A base station (BS) for channel state information (CSI) estimation in a wireless communication system, the BS comprising:
    a transceiver configured to receive, from a user equipment (UE), a sounding reference signal (SRS) for the CSI estimation; and
    a processor operably connected to the transceiver, the processor configured to:
        determine whether the received SRS is measurable for the CSI estimation;
        initialize a set of uplink parameters based on a result of the determination;
        update, the set of uplink parameters based on SRS history stored in a buffer; and
        perform, using a channel prediction model and channel reciprocity, the CSI estimation based on the updated uplink parameters.

2. The BS of claim 1, wherein the processor is further configured to:
    input predicted CSI to massive multi-input multi-output unit (MMU) scheduler; and
    input the predicted CSI to a downlink multi-user multi-input multi-output (MU-MIMO) precoder.

3. The BS of claim 1, wherein the processor is further configured to obtain an SRS buffer noise variance that is determined based on the updated uplink parameters.

4. The BS of claim 1, wherein the set of uplink parameters comprises path delay, Doppler and path weights from a number of paths between the UE and the BS.

5. The BS of claim 1, wherein the processor is further configured to update path delay and Doppler with EKF using a vectorized signal model of SRS estimates.

6. The BS of claim 5, wherein the vectorized signal model includes a time index sequence and a frequency index sequence of subband SRS that is processed in the buffer.

7. The BS of claim 4, wherein the processor is further configured to initialize the set of uplink parameters using a grid search algorithm in accordance with an iterative sequential interference cancellation (SIC)-type scheme.

8. The BS of claim 4, wherein the processor is further configured to update the set of uplink parameters using a linear or nonlinear calculation of path weights.

9. The BS of claim 1, wherein the processor is further configured to use a least square scheme to update path weights.

10. The BS of claim 1, wherein the set of uplink parameters comprises channel autocorrelation function, and the processor uses a Wienerfilter to perform downlink CSI estimation.

11. A method of a base station (BS) for channel state information (CSI) estimation in a wireless communication system, the method of BS comprising:
    receiving, from a user equipment (UE), a sounding reference signal (SRS) for the CSI estimation;
    determining whether the received SRS is measurable for the CSI estimation;
    initializing a set of uplink parameters based on a result of the determination;
    updating the set of uplink parameters based on SRS history stored in a buffer; and
    performing, using a channel prediction model and channel reciprocity, the CSI estimation based on the updated set of uplink parameters.

12. The method of claim 11, further comprising:
    inputting predicted CSI to massive multi-input multi-output unit (MMU) scheduler; and
    inputting the predicted CSI to a downlink multi-user multi-input multi-output (MU-MIMO) precoder.

13. The method of claim 11, further comprising obtaining an SRS buffer noise variance that is determined based on the updated uplink parameters.

14. The method of claim 11, wherein the set of uplink parameters comprises path delay, Doppler and path weights from a number of paths between the UE and the BS.

15. The method of claim 11, further comprising updating path delay and Doppler with EKF using a vectorized signal model.

16. The method of claim 15, wherein the vectorized signal model includes a time index sequence and a frequency index sequence of subband SRS that is processed in the buffer.

17. The method of claim 14, further comprising initializing the set of uplink parameters using a grid search algorithm in accordance with an iterative sequential interference cancellation (SIC)-type scheme.

18. The method of claim 14, further comprising updating the set of uplink parameters using a linear or nonlinear calculation of path weights.

19. The method of claim 11, further comprising using a least square scheme to update path weights.

20. The method of claim 11, wherein the set of uplink parameters comprises channel autocorrelation function, and a Wienerfilter is used to perform downlink CSI estimation.

* * * * *